(12) United States Patent
Bushell

(10) Patent No.: US 7,885,338 B1
(45) Date of Patent: Feb. 8, 2011

(54) DECODING INTERDEPENDENT FRAMES OF A VIDEO FOR DISPLAY

(75) Inventor: John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1641 days.

(21) Appl. No.: 11/113,358

(22) Filed: Apr. 25, 2005

(51) Int. Cl.
H04B 1/66 (2006.01)
H04N 7/12 (2006.01)

(52) U.S. Cl. .................................. 375/240.25
(58) Field of Classification Search ............ 375/240.25, 375/240.24, 240.29; 725/90; 709/219; 386/68; 345/545; H04B 1/66; H04N 7/12
See application file for complete search history.

(56) References Cited

U.S. PATENT DOCUMENTS

| | | | |
|---|---|---|---|
| 5,335,299 A | 8/1994 | Atkinson | |
| 5,461,679 A | 10/1995 | Normile et al. | |
| 5,732,217 A * | 3/1998 | Emura | 725/90 |
| 5,752,266 A * | 5/1998 | Miyawaki et al. | 711/158 |
| 6,016,360 A | 1/2000 | Nguyen et al. | |
| 6,122,662 A * | 9/2000 | Emura | 709/219 |
| 6,246,720 B1 * | 6/2001 | Kutner et al. | 375/240.25 |
| 6,573,846 B1 | 6/2003 | Trivedi et al. | |
| 6,628,719 B1 * | 9/2003 | Kono et al. | 375/240.28 |
| 6,704,846 B1 * | 3/2004 | Wu et al. | 711/150 |
| 6,728,315 B2 | 4/2004 | Haskell et al. | |
| 6,781,529 B1 | 8/2004 | Lin et al. | |
| 6,804,449 B1 * | 10/2004 | Desai | 386/68 |
| 6,823,016 B1 * | 11/2004 | Nguyen et al. | 375/240.25 |
| 7,130,526 B2 * | 10/2006 | Abelard et al. | 386/68 |
| 7,218,676 B2 * | 5/2007 | Kono et al. | 375/240.25 |
| 7,660,352 B2 * | 2/2010 | Yamane et al. | 375/240.12 |
| 2002/0136294 A1 | 9/2002 | Culbert | |
| 2004/0258160 A1 * | 12/2004 | Bhatia | 375/240.25 |
| 2005/0018775 A1 * | 1/2005 | Subramanian et al. | 375/240.25 |
| 2006/0072671 A1 * | 4/2006 | Aggarwal et al. | 375/240.25 |
| 2006/0133770 A1 * | 6/2006 | Shibata et al. | 386/68 |
| 2007/0195101 A1 * | 8/2007 | Senior et al. | 345/545 |

* cited by examiner

*Primary Examiner*—Tung Vo
(74) *Attorney, Agent, or Firm*—Fish & Richardson P.C.

(57) ABSTRACT

A module may provide codec-independent services including determining frame display order, frame dependency sets, and queuing the dependency frames in advance so as to enable display of a video. The module enables a video to be played forwards or backwards at a variety of playback speeds from any position within the video. In one implementation, a device communicatively coupled to a plurality of decoders accesses a video that includes a plurality of frames. One or more of the frames are decodable by one or more of the communicatively coupled decoders. The device identifies a frame in the video that is to be displayed, and determines a plurality of dependency frames in the video upon which decoding of the frame to be displayed depends. The device provides an indication that one or more associated dependency frames are to be decoded.

47 Claims, 10 Drawing Sheets

150

| sample number (152) | sync frame? (154) | partial sync frame? (156) | droppable (158) | decode duration (160) | display offset (162) | partial sync threshold (164) |
|---|---|---|---|---|---|---|
| 1 | Y | N | N | 20 | 20 | 2 |
| 2 | N | N | Y | 20 | 20 | 2 |
| 3 | N | N | Y | 20 | 20 | 2 |
| 4 | N | N | N | 20 | 20 | 2 |
| 5 | N | N | Y | 20 | 20 | 2 |
| 6 | N | N | Y | 20 | 20 | 2 |

FIG. 1A

DECODING INTERDEPENDENT FRAMES OF A VIDEO FOR DISPLAY

TECHNICAL FIELD

This document relates to video processing.

BACKGROUND

Video playback systems typically work with compressed video. Compression of a video can be done using a variety of different codes, and corresponding codecs compress the video by removing redundant information from frames of the video such that the redundant information may be reconstructed when the frames are displayed. Many codecs use I-, P-, and B-frames. An I-frame is decoded without reference to another frame, a P-frame is decoded with reference to one or more frames that are displayed before the P-frame, and a B-frame is decoded with reference to one or more frames that are displayed after the B-frame and zero or more frames that are displayed before the B-frame. In playback of an I-P-B video, the video playback system typically decompresses the frames of the video by decoding the frames in a decode order that is different from the display order, usually due to dependencies of B-frames. Thus, decoding the frames in display order may result in incorrect decompression of the video. Furthermore, decoding multiple frames to display a particular frame may result in a delay between the display of the particular frame and the display of a succeeding frame, due to the relatively large amount of decoding that is to be performed. Furthermore, the complexities introduced by B-frames also make reverse-mode playback and jump-mode more challenging.

SUMMARY

A disclosed video playback system plays back video that is compressed with any of a variety of different codecs. The system includes a queuing engine that determines the dependencies of frames of the video that are to be displayed, regardless of which of the supported codecs was used to encode the frames. The queuing engine uses the determined dependencies to decode frames upon which the frames to be displayed depend so that the frames can be displayed properly. The queuing engine performs its operations so as to meet the inherent timing requirements so that the video plays back at the intended display rate.

The capability to determine dependencies also is used in jump-mode to allow the system to display a jumped-to frame without needing to back up to a previous I-frame and begin the decoding and display process from that I-frame. Additionally, the system supports reverse playback by providing input to the queuing engine from the codec, or from a manager of the codec, indicating that a particular frame may not continue to be buffered. The queuing engine can then re-queue the particular frame, if needed. A need may arise, for example, if the particular frame is needed for decoding still other frames, or if the particular frame needs to be displayed at a later point in time.

In one general aspect, a device communicatively coupled to a plurality of decoders accesses a video that includes a plurality of frames. One or more of the frames are decodable by one or more of the communicatively coupled decoders. The device identifies a frame in the video that is to be displayed, and determines a plurality of dependency frames in the video upon which decoding of the frame to be displayed depends. The device provides an indication that one or more associated dependency frames are to be decoded.

Implementations may include one or more of the following features. For example, providing an indication that one or more associated dependency frames are to be decoded may include providing an indication that one or more associated dependency frames are to be queued for decoding by one of the communicatively coupled decoders. An indication that the frame to be displayed is to be queued for decoding by one of the communicatively coupled decoders may be provided after the one or more associated dependency frames have been queued for decoding. One or more messages indicating that the set of dependency frames has been queued may be received.

An indication that the one or more associated dependency frames, or the frame to be displayed, are to be loaded from a data store may be provided. One or more messages indicating that the one or more associated dependency frames, or the frame to be displayed, have been loaded may be received.

The multiple supported codecs may include an MPEG-2 codec and an MPEG-4 AVC/H.264 codec. The frame to be displayed may be encoded using information included in the frame to be displayed and using information included in another frame included in the video that is to be displayed before or after the frame to be displayed.

Determining a plurality of dependency frames in the video upon which decoding of the frame to be displayed depends may include determining the plurality of dependency frames based upon an indication of one or more other frames for which an indication that the other frames are to be decoded has been provided. The device may include a computer processor or a video playback application. Accessing a video may include accessing a video that includes frames that have been reordered.

Providing an indication that one or more associated dependency frames are to be decoded may include providing the indication to each of the decoders associated with the dependency frames. Providing an indication that one or more associated dependency frames are to be decoded also may include providing the indication to a manager of the plurality of decoders.

In another general aspect, a video to be displayed is accessed. The video includes two or more frames, and a first frame of the two or more frames has been encoded using information included in the first frame and information included in a second frame of the two or more frames that has a reverse-play display time after that of the first frame. A request to display the video in reverse-play is received. It is determined that the first frame is to be displayed, and that the second frame was used to encode the first frame. Queuing of the second frame for decode and queuing of the first frame for decode and display are signaled for. It is determined that the second frame is to be displayed. An indication of whether the second frame needs to be decoded again before the second frame can be displayed is accessed, and queuing of the second frame for decode and display is signaled for based on the accessed indication.

Implementations may include one or more of the following features. For example, signaling for the second frame to be queued for decode and display may be based on an indication that the second frame needs to be decoded again before the second frame can be displayed. Accessing an indication of whether the second frame needs to be decoded again before the second frame can be displayed may include receiving a message indicating that the second frame was not buffered for later display. It may be determined not to display a frame that includes information that is not used to encode second frames of the video.

In another general aspect, a video to be displayed is accessed. The video includes two or more frames, with a first frame of the two or more frames having been encoded using information included in the first frame and using information included in a second frame that is to be displayed before or after the first frame. A request to step to the first frame out of order is received, and the first frame is stepped to out of order.

Implementations may include one or more of the following features. For example, stepping to the first frame out of order may include identifying the second frame as a frame upon which the encoding of the first frame depends. Queuing of the second frame for decode but not for display may be signaled for, and queuing of the first frame for decode and display may be signaled for. The first frame may be displayed until instructed by a user to display another frame.

In another general aspect, a device communicatively coupled to a plurality of decoders receives a video that includes a plurality of frames. One or more of the frames are decodable by one or more of the communicatively coupled decoders. The device determines that a frame in the video is to be displayed, and determines a plurality of dependency frames in the video upon which decoding of the frame to be displayed depends. The device provides an indication that one or more associated dependency frames are to be decoded.

These general and specific aspects may be implemented using a system, a method, instructions such as a computer program, or a combination of systems, methods, and computer programs.

Other features will be apparent from the description and drawings, and from the claims.

DESCRIPTION OF DRAWINGS

FIG. 1A is a block diagram of a sample table of a video.

DETAILED DESCRIPTION

Various disclosed implementations include a video mentor in a video playback application to control forward and reverse playback of a video at various playback speeds. The video mentor enables playback of a video that has been compressed with one of multiple supported codecs. The video mentor identifies frames to be displayed, and frames upon which the frames to be displayed depend. The video mentor then instructs an image compression manager to decode (also referred to as decompress) the frames of the video such that the frames may be decompressed properly. In other words, the video mentor instructs the image compression manager to decode the frames in an order that ensures that dependencies between the frames are correctly considered when decoding the frame. Consequently, the order in which the video mentor indicates that the frames should be decoded may differ from an order in which the frames are to be displayed.

One implementation of video mentor identifies the frames that should be decoded using a sample table that includes information describing the frames. More particularly, the video mentor uses the sample table to identify dependencies between the frames. The video mentor uses the identified dependencies to identify the frames that should be decoded. The video mentor tracks states of the frames to determine whether the frames have been loaded, queued, decoded, or displayed. The video mentor may base future queuing suggestions for the image compression manager on the internally tracked frame states.

In addition, the video mentor queues the frames for decoding in advance of when the frames are to be displayed. As a result, the image compression manager is able to fully decode a frame before the frame is to be displayed, which allows the frame to be displayed immediately after a previous frame has finished displaying without a perceptible delay. Therefore, the video mentor enables videos with complex dependencies between frames to be played correctly and with high quality.

Figure 1:
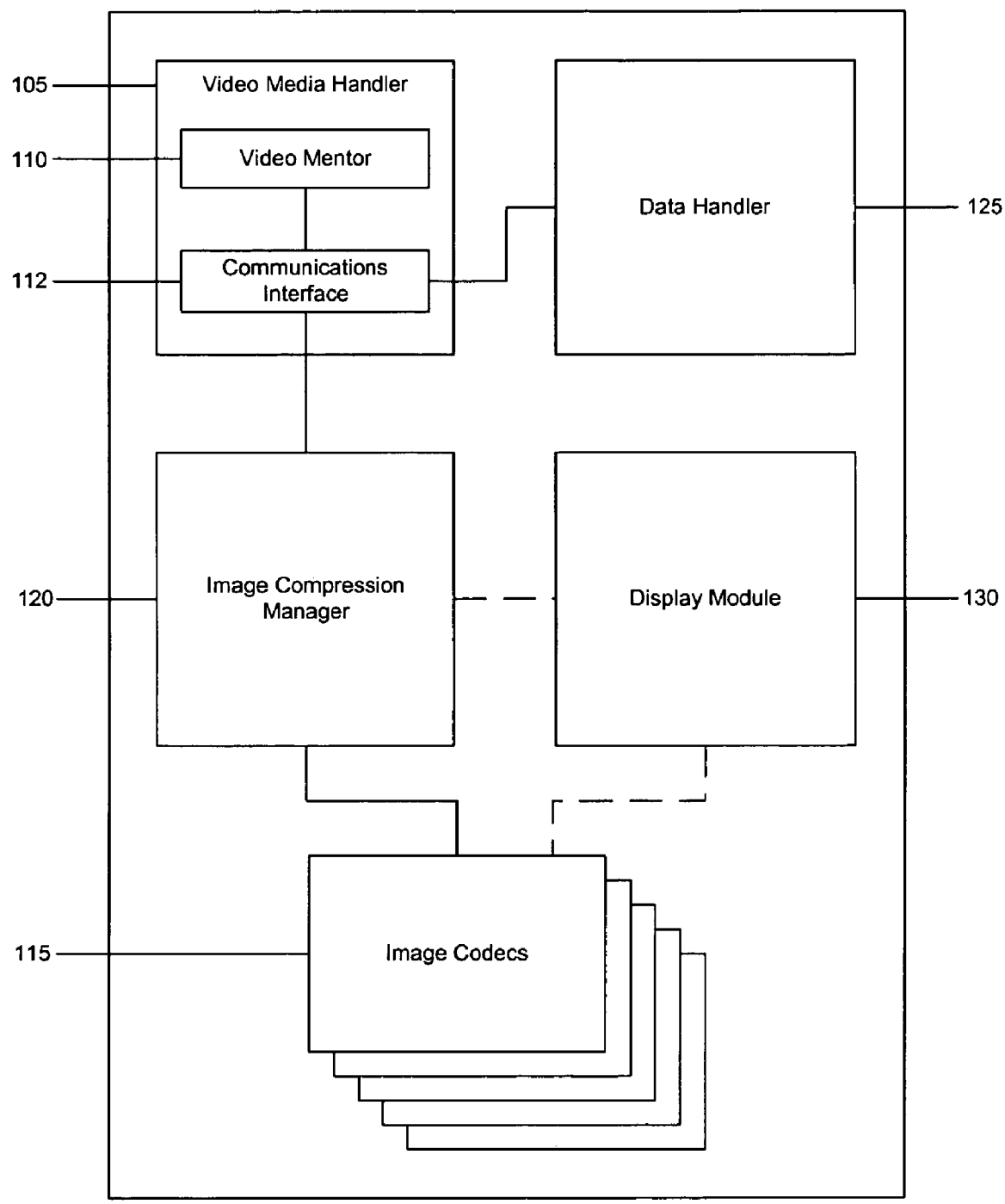
FIG. 1 is a block diagram of an application for displaying video.

Referring to FIG. 1, a video playback application 100 is used to decode and display a video that includes encoded frames. The video playback application 100 includes a video media handler 105, which includes a video mentor 110 and a communications interface 112. The video playback application 100 also includes multiple image codecs 115 that are controlled by an image compression manager 120. The video playback application 110 also includes a data handler 125 and a display module 130.

The video media handler 105 monitors playback of a video to be displayed with the video playback application 100. The video media handler 105 oversees loading, decoding, and displaying of the video. More particularly, the video media handler 105 instructs other components of the video playback application 100 to load, decode, and display frames of the video. In addition, the video media handler 105 monitors the playback of the video using messages received from the other components of the video playback application 100.

One implementation of the video mentor 110 communicates with other components of the video playback application 100 through the communications interface 112. Based on goal information, such as playback direction, playback speed, and a look-ahead time range, the video mentor 110 guides decisions on what frames should be queued for decode and display. More particularly, the video mentor 110 identifies the frames of the video that should be decoded in order for the frames to be displayed properly. The frames that should be decoded are identified based on dependencies between the frames.

A video may include multiple sections that have each been encoded with a different codec. In typical implementations, a frame from one section does not depend on any frames from another section. The video mentor 110 is capable of playing the video through the boundaries between the sections. In other words, the video mentor 110 identifies the dependencies of the frames of each of the sections without reference to a codec that was used to encode the sections. Therefore, to the video mentor 110, the video appears to include a single section.

In addition, the video mentor 110 signals for frames to be decoded in advance of when they are to be displayed such that the frames are displayed without a perceptible delay between the frames. For example, the video mentor may signal for a particular frame and the frames upon which the particular frame depends to be decoded such that the particular frame is ready to be displayed one second in advance of when the particular frame actually is to be displayed. The video mentor 110 maintains a common model of the dynamic state of frames (see FIG. 5) based on messages that report state transitions. The states of the frames are used when identifying frames to be loaded and queued for decode or display. The model of the dynamic state of the frames is maintained across goal changes, such that, for example, if frames were decoded during playback, the frames can continue to be used during stepping.

The video mentor 110 identifies frames of a video that need to be decoded such that portions of the video may be displayed correctly to a user of the video playback application 100. The video may be displayed to the user forwards or backwards at multiple playback speeds. In addition, playback of the video may be controlled by the user. The video mentor 110 is most useful when the video is played in reverse or when the user controls playback of the video. Furthermore, the video mentor 110 is useful when playback of the video does not begin at the beginning of the video. In such cases, the video mentor 110 queues the frames that need to be decoded to enable playback of the video from a desired position in a desired direction at a desired speed.

The communications interface 112 enables the video mentor 110 to communicate with the other components of the video playback application 100. More particularly, the video mentor 110 communicates with the image compression manager 120 and the data handler 125 through the communications interface 112. In some implementations, the video media handler 105 may include multiple communications interfaces 112. For example, the video media handler 105 may include a first communications interface 112 through which the video mentor 110 may communicate with the image compression manager 120, and a second communications interface 112 through which the video mentor 110 may communicate with the data handler 125.

The image codecs 115 are tools for compressing and decompressing video. In some implementations, compressing a video may be referred to as encoding a video, and decompressing a video may be referred to as decoding a video. Each of the image codecs 115 may have a different notion of frame dependency structure. For example, the image codecs 115 may encode and decode videos using one or more of only I-frames, using I-frames and P-frames, or using I-, P-, and B-frames. Each of the image codecs 115 includes a decoding tool that decompresses video. Each of the image codecs 115 also may include an encoding tool that compresses video. An encoding tool compresses the video by removing redundant information from frames of the video. In removing redundant information from a frame of the video, the encoding tool associates the frame with another frame from which the redundant information may be retrieved. The decoding tool of one of the image codecs 115 decompresses the video by recreating the redundant information that was removed by the encoding tool, based on the dependencies between the frames of the video. The image codecs 115 are used primarily to decompress video that is to be played with the video playback application 100. In typical implementations, an encoding tool that is external to the video playback application 100 is used to compress a video that is played with the video playback application 100. The image codecs 115 may include, for example, a Motion Picture Experts Group 2 (MPEG-2) codec, an MPEG-4 Advanced Video Coding (AVC)/H.264 codec, or a Cinepak codec. Typically, newer codecs, such as MPEG-4 AVC/H.264 allow more general dependency patterns between frames than older codecs, such as MPEG-2, which typically allow more limited dependency patterns.

The image compression manager 120 is an interface to the image codecs 115, and may be referred to as a codec manager. More particularly, the image compression manager 120 requests and receives an indication of frames of the video to be decoded from the video mentor 110, and the image compression manager 120 passes the frames to an appropriate one of the image codecs 115 for decoding. The image compression manager is configured to identify a codec that was used to encode each frame based on metadata that is associated with the frame. The image compression manager 120 or the appropriate one of the image codecs 115 may keep track of and buffer the frames that have been identified by the video mentor 110 for later display and decoding of other frames such that the video mentor 110 is not required to identify the frames for decode or display multiple times.

In one implementation, the image compression manager 120 also provides the decoded frames to the display module 130 for display. The image compression manager 120 may process the decoded frames further before providing the decoded frames to the display module 130. In other implementations, one of the codecs 115 that decoded the frames may provide the decoded frames to the display module 130 directly. In one implementation, the image compression manager 120 sends messages to the video mentor 110 through the communications interface 112 to notify the video mentor 110 when frames have been queued, decoded, and displayed. In another implementation, the communications interface 112 may send the video mentor 110 a message indicating that frames are about to be queued before forwarding an indication that the frames should be queued from the video mentor 110 to the image compression manager 120. In such an implementation, the image compression manager 120 still may notify the video mentor 110 when frames have been decoded or displayed. Sending messages in such a manner may prevent the video mentor 110 from receiving a message indicating that a frame has been decoded or displayed before receiving a message that the frame has been queued.

The data handler 125 loads frames of the video to be displayed into active memory. The data handler 125 requests and receives instructions to load particular frames of the video into active memory from the video media handler 105, and, more particularly, from the video mentor 110 through the communications interface 112. In response, the data handler 125 accesses a data store that includes the video, and loads the data into active memory. The data handler 125 also notifies the video media handler 105 once the frames have been loaded.

The display module 130 enables frames that have been decoded by the image compression manager 120 and the image codecs 115 to be displayed. For example, the display module 130 may provide the decoded frames to a user interface of the video playback application 100 such that the user interface may display the frames. The display module 130 may control an amount of time for which each of the frames are displayed. Alternatively or additionally, the display module 130 may display a particular frame until a later frame is to be displayed. The display module may communicate with the image compression manager 120 to inform the image compression manager 120 when a frame has been displayed.

Various pairs of the components of the video playback application 100 are connected to illustrate communications between the components. For example, the video mentor 110 and the communications interface 112 are connected to indicate that the video mentor 110 and the communications interface 112 communicate. Similarly, the communications interface 112 is connected to the image compression manager 120 and the data hander 125, and the image compression manager 120 is connected to the image codecs 115. The display module 130 is connected to the image compression manager 120 in some implementations, and to the codecs 115 in other implementations. In other words, the display module 120 may receive the decoded frames to be displayed directly from one of the codecs 115, or indirectly from the image compression manager 120.

Referring to FIG. 1A, a sample table 150 includes information describing frames included in a video. All or part of the information is used by the video mentor 110 to determine frame dependencies and queuing orders. The sample table 150 includes columns 152-164 for descriptors of the frames, and rows 176-186 for the frames. The value at a particular row and a particular column within the sample table 150 is the value of the descriptor (corresponding to the particular column) for the frame (corresponding to the particular row). More particularly, the sample table 150 indicates for each of the frames a sample number 152, and whether the frames are sync frames 154, partial sync frames 156, or droppable frames 158. The sample table 150 also indicates the decode duration 160, display offset 162, and partial sync threshold 164 of each of the frames.

The columns 154 and 156 may be used to identify a previous or next sync or partial sync frame for a particular frame. For example, a previous sync frame for a particular frame is a frame that has a sample number from the column 152 that is less than the sample number of the particular frame, and that is identified as a sync frame by the sync frame column 154. Similar identifications of a next sync frame, a previous partial sync frame, and a next partial sync frame for a particular frame may be made. In some implementations, the sample table 150 may include columns that explicitly indicate a next sync frame, a previous sync frame, a next partial sync frame, and a previous partial sync frame such that those frames do not need to be otherwise identified.

The decode time for a frame is the time at which the frame is decoded. The decode duration for a frame is an amount of time between when decoding of the frame begins and when decoding of a subsequent frame begins, which is not necessarily the amount of time needed to decode the frame. Information included in the decode duration column 160 may be used to calculate a decode time of each of the frames. For example, the decode time of the first frame in row 176 is assumed to be zero. In addition, the decode time of a particular sample is the sum of the decode duration and the decode time of an immediately previous frame. For example, the decode time the third frame in row 180 is 40, because the decode time of the second sample in row 178 is 20 (because the decode time of the first frame is 0 and the decode duration of the first frame is 20), and because the decode duration of the second sample is 20. In some implementations, the sample table 150 may include a column indicating a decode time of each of the frames, such that the decode time does not need to be calculated otherwise.

The display offset for a frame is a signed integer indicating an amount of time between when a frame is decoded and when the frame is displayed. Information included in the display offset column 162 and the decode duration column 160 may be used to identify a display time and a display duration for each of the frames. For example, the display time of a particular frame is the sum of the decode time and the display offset for the particular frame. For example, the display time of the second frame in row 180 is 40, because the decode time of the second frame is 20, and because the display offset of the second frame is 20. The display time for a frame is nonnegative, so if the display offset is negative, it must have a magnitude that is less than or equal to the decode time of the frame. In addition, the display duration of a particular frame is the difference between the display times of the particular frame and a frame that immediately follows the particular frame. For example, the display duration of the second frame is 20, because the display time of the second frame is 40 and the display time of the third frame in row 182 is 60. In some implementations, the sample table 150 may include columns indicating a display time and a display duration for each of the frames, such that the display time and the display duration do not need to be calculated otherwise.

The partial sync threshold column 164 indicates the number of partial sync samples needed for full synchronization. Consequently, the partial sync threshold column 164 indicates the frames upon which each of the frames may depend. For example, a particular frame may depend on any frames within a number of partial sync frames indicated by the partial sync threshold column 164 of the particular frame. In typical implementations, each of the frames has a default partial sync threshold of 2.

In one implementation, the sample table 150 also may include an indication of a number of frames upon which each of the described frames depends. For example, the sample table 150 may identify how many frames upon which a frame that is not a sync frame or a partial sync frame depends. By definition, sync frames and partial sync frames depend on zero frames, but other frames may depend on any number of frames. However, frames that are not sync or partial sync frames typically depend on at least one other frame. The indication of the number of frames upon which a frame depends may be used to identify the frames upon which the frame depends when decoding the frame.

Figure 2:
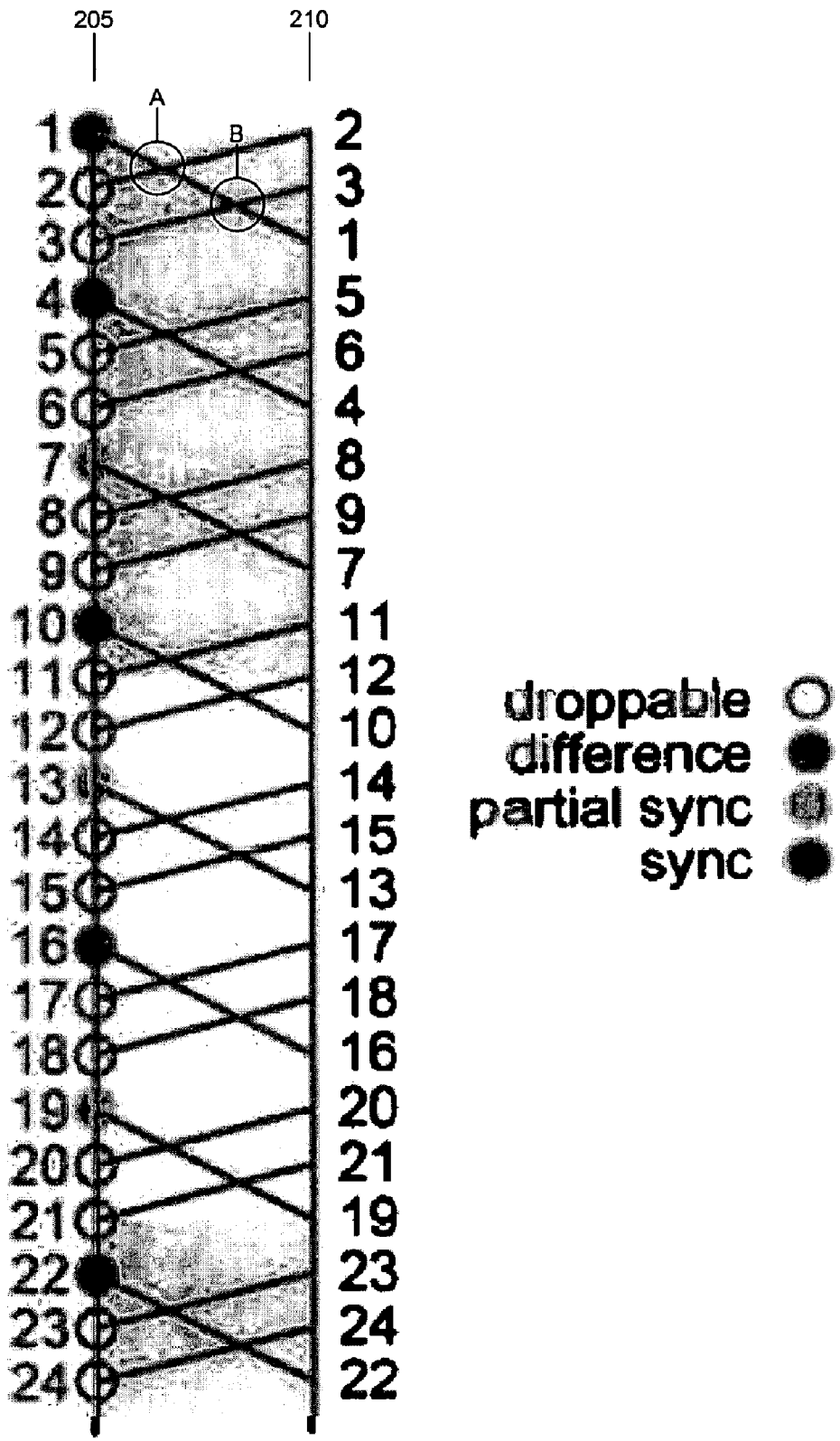
FIG. 2 is an illustration of a sequence of frames included in a video.

Referring to FIG. 2, a timeline 200 is shown for a sample video that includes 24 frames. The timeline 200 includes a decode timeline 205 and a display timeline 210. Each frame is represented with a circle along the decode timeline 205. Sample numbers for the frames are provided along the decode timeline 205. A line extends from each frame on the decode timeline 205 to the display timeline 210 to indicate the positions of the 24 frames along the display timeline 210. The numbers of the frames are included along the display timeline 210 to further indicate the position of the frames along the display timeline 210. The decode timeline 205 indicates an order in which the 24 frames are decoded, and the display timeline 210 indicates an order in which the 24 frames are displayed.

The circles representing the frames are shaded to indicate a type of each of the frames. Each of the frames may be one of four types: sync frames, partial sync frames, difference frames, and droppable frames. Sync frames and partial sync frames are examples of I-frames, which, as described earlier, are frames that may be encoded and decoded without reference to any other frames. A subsequent frame may not be decoded based solely on a partial sync frame, but may be decoded based solely on a sync frame. Frame 1 is a sync frame, and frames 7, 13, and 19 are partial sync frames.

Difference frames are encoded and decoded with reference to a previously or subsequently displayed frame. The previously displayed frame may be a sync frame, a partial sync frame, or a difference frame. P-frames and B-frames, which were described earlier, are examples of difference frames. Frames 4, 10, 16, and 22 are difference frames.

Droppable frames are a specific type of difference frame that is not used to decode other frames. Therefore, droppable frames may be dropped from the video when conserving available buffer space for frames of the video that are used to decode other frames. Frames 2, 3, 5, 6, 8, 9, 11, 12, 14, 15, 17, 18, 20, 21, 23, and 24 are droppable frames.

The sample table 150 includes information describing the first six frames of the video displayed on the decode timeline 205. The sample table 150 may be used to generate the timeline 200. In other words, the dependencies between the frames of the video are identified using the sample table 150. The dependencies may be used to identify the decode order displayed on the decode timeline 205. In addition, the display order of the frames that is displayed on the display timeline 210 may be identified from the sample table 150. The lines between the decode timeline 205 and the display timeline 210 may be generated by connecting corresponding frames between the timelines 205 and 210.

In some implementations, a video may be separated into one or more sets of frames, or groups of pictures (GOPs). For example, the video illustrated in FIG. 2 includes four GOPs. The first frame in a GOP is a sync frame or a partial sync frame, and the other frames in the GOP are difference frames or droppable frames. Therefore, a GOP is a sync or a partial sync frame and all difference and droppable frames that are to be decoded after the sync or partial sync frame and before another sync or partial sync frame. For example, frames 1-6, frames 7-12, frames 13-18, and frames 19-24 each represent a GOP. The second, third, and fourth GOPs of the video are open GOPs, which indicates that frames from an earlier GOP are used to decode frames in a current GOP. A GOP beginning with a partial sync frame indicates that the GOP is an open GOP, because later frames of the GOP may not be decoded based only on the partial sync frame. As a result, the later frames require one or more frames from a previous GOP to be decoded correctly.

In other videos, the GOPs may be closed GOPs, which indicates that decoding frames of a current GOP only uses frames from the current GOP. Videos with closed GOPs do not include partial sync frames, because frames from a current GOP do not require frames from other GOPs to be decoded. The first GOP of the video necessarily is a closed GOP, because the video does not include an earlier GOP to which the first GOP may refer.

As stated earlier, the order in which the frames are decoded is indicated by the decode timeline 205. More particularly, a first frame that appears above a second frame on the decode timeline 205 indicates that the first frame is decoded before the second frame. The decode order and the types of the frames identifies the dependencies between the frames of the video 200. A difference or a droppable frame depends on all previous non-droppable frames back to and including either a sync frame or two partial sync frames. In general, a particular difference frame or a droppable frame depends on all sync frames, partial sync frames, and difference frames between the particular difference frame or droppable frame and a most recent sync frame, including the most recent sync frame. For example, difference frame 10 depends on sync frame 1, difference frame 4, and partial sync frame 7. As another example, droppable frame 5 depends on sync frame 1 and difference frame 4.

A particular difference or droppable frame also may depend on all partial sync frames and difference frames that are within a given number of partial sync frames of the particular frame, provided a sync frame does not appear within a given number partial sync frames of the particular frame. In typical implementations, the given number is two. For example, difference frame 22 depends on partial sync frame 13, difference frame 16, and partial sync frame 19. As another example, droppable frame 17 depends on partial sync frame 7, difference frame 10, partial sync frame 13, and difference frame 16.

As an example, frames 2, 3, 1, and 5 are the first four frames of the video to be displayed. Frame 2 depends on frame 1, so frame 1 is decoded and is used to decode frame 2. Frame 2 is displayed after being decoded. Frame 3 also depends on frame 1, so frame 1, which has been decoded already, is used to decode frame 3. Frame 3 is displayed immediately after frame 2 is done being displayed, and frame 1, having been decoded already, is displayed after frame 3 is done being displayed. Frame five depends on frame 1, which has already been decoded, and on frame 4. Therefore, frame 4 is decoded and is used to decode frame 5, and frame 5 is displayed after frame 1 is done being displayed.

A particular frame may depend directly or indirectly on previously decoded frames. For example, a difference or droppable frame may depend directly on a sync, partial sync, or difference frame, and indirectly on other frames on which the difference frames depends. In one implementation, the particular frame may depend directly on a particular number of other frames, and indirectly on the frames upon which the particular number of other frames depend directly. For example, each of the frames in the video 200 may depend directly on two earlier frames in decode timeline 205. Therefore, droppable frame 8 depends directly on difference frame 4 and partial sync frame 7, and indirectly on sync frame 1 because difference frame 4 depends directly on sync frame 1. In some implementations, a difference frame may depend directly on one frame that is displayed at some point before or after the difference frame, and indirectly on other frames used to decode the one frame. Therefore, a frame may both directly and indirectly depend on a particular frame. For example, droppable frame 5 depends directly on frame 1, which is displayed before frame 5, and on frame 4, which is displayed after frame 5. However, frame 1 is used to decode frame 4, so frame 5 also depends indirectly on frame 1.

A sync frame or a partial sync frame may be decoded correctly without regard to previously decoded frames. A frame that is not a sync frame or a partial sync frame, such as a difference frame, may only be decoded correctly in its correct "temporal context," meaning following decoding of the preceding sync frames (or a number of preceding partial sync frames that is equal to the partial sync threshold) and the intermediate, non-droppable difference frames. In other words, the temporal context of a frame refers to a state of decoding of the frames of the video. The temporal context changes with each frame that is decoded, and the manner in which the temporal context changes may depend on the type of frame that is decoded. For example, when a sync frame is decoded, the temporal context is irrelevant, because the sync frame does not depend on another previously decoded frame that is indicated by the temporal context. After the sync frame is decoded, a frame following the sync frame, which may depend on the sync frame, may be decoded. Similarly, a partial sync frame may be correctly decoded without regard to the prior temporal context. After the partial sync frame is decoded, subsequent frames may be decoded, but their correctness is not ensured until a number that equals the partial sync threshold of consecutive partial sync frames, and all non-droppable frames between the consecutive partial sync frames, have been decoded. In other words, decoding a sync frame completely resets the temporal context, and decoding a partial sync frame partially resets the temporal context.

Other types of frames rely on the temporal context already being set up before the frames may be decoded. For example, difference frames, which may be classified as droppable and non-droppable, rely on the temporal context being set up when they are to be decoded. A difference frame is droppable if decoding the difference frame does not impact the temporal context. A difference frame is non-droppable if decoding the difference frame does update the temporal context, for example, by advancing the temporal context such that a subsequent frame may be decoded correctly based on the updated temporal context.

Because a frame may be decoded based on one or more frames that that are displayed after the frame, the frames of the video may not be decoded in the same order in which the frames are displayed. For example, frame 1 is decoded before frame 2 and frame 3, even though frame 1 is displayed after frame 2 and frame 3, because frame 2 and frame 3 depend on frame 1. In general lines crossing between the decode time line 205 and the display time line 210, such as at points A and B, indicate that frames have been decoded in an order that differs from the order in which the frames are displayed. If the frames were decoded in the order in which they are displayed, the frames would not be decoded correctly and, therefore would be displayed incorrectly.

Furthermore, a particular frame may depend on multiple other frames, which necessitates accessing and decoding those other frames before the particular frame may be decoded. For example, as described above, frame 17 depends on four other frames. As a result, decoding of the particular frame may need to begin a significant amount of time in advance of when the particular frame is to be displayed such that a delay between the display of a previous frame (for example, frame 13) and the display of the particular frame (for example, frame 17) is not experienced. As a result, by decoding the particular frame and the frames upon which the particular frame depends in advance of when the particular frame is to be displayed, the quality of playback of the video may increase.

The video mentor 110 may queue the frames of the video in an order that results in the frames being decoded and displayed correctly. In addition, the video mentor queues the frames for decode and display such that the frames are displayed without a perceptible delay between adjacent frames. In other words, the video mentor enables encoded videos to be displayed faithfully and correctly.

Figure 3:
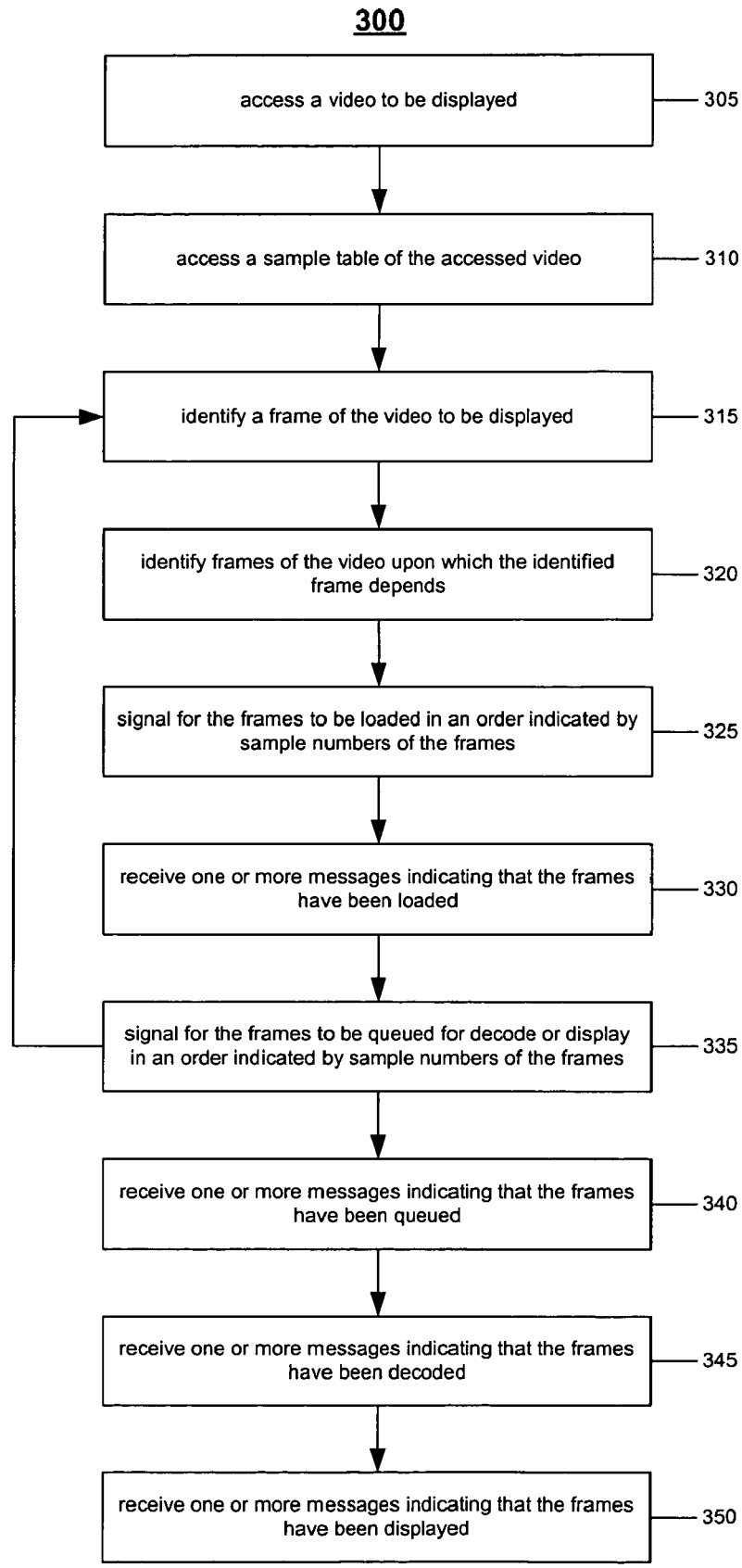
FIG. 3 is a flow chart of a process for queuing frames of a video for decode and display.

Referring to FIG. 3, a process 300 is used to control playback of a video. The process 300 is executed by the video mentor 110. The process 300 is used to queue frames of the video for decode or display in an order required for proper playback of the video. In addition, the process 300 is used to decode frames for display in advance of when the frames are to be displayed such that the frames may be displayed without a perceptible delay between the frames.

The video mentor 110 accesses a video to be displayed (305). The video may include sync frames, partial sync frames, difference frames, and droppable frames. The video mentor 110 may access the video for regular forward playback, reverse playback, or for user-controlled playback. For example, when the video is played regularly, each frame of the video may be played sequentially for a pre-defined amount of time. In some implementations, each frame of the video may be displayed for ⅓₀ second. When a user controls playback, the user may select particular frames within the video for display. In addition, the user may step through the video by manually indicating when a subsequent frame should be displayed. When a user is controlling playback of the video, decoding the frames in advance of when the frames are to be displayed may not be possible.

The video mentor 110 also accesses a sample table of the video (310). For example, the video mentor 110 may access a sample table of the video that is similar to the sample table 150 of FIG. 1A. The sample table includes metadata describing the frames of the video. For example, the video mentor 110 may use the sample table 150 to identify whether a given frame is a sync frame 154, whether a given frame is a partial sync frame 156, or whether a given frame is a droppable frame 158. The video mentor 110 also may identify a previous or next sync or partial sync frame with the sample table 150. The decode duration 160, display offset 162, decode time, display time, and display duration of a frame also may be identified with the sample table 150. Consequently, the video mentor 110 may identify a frame that is to be displayed at a particular time with the sample table 150 by examining the display times of the frames. The video mentor 110 also may identify a partial sync threshold 164 for each of the frames.

The video mentor 110 identifies a frame of the accessed video to be displayed (315). The video mentor 110 may access an indication of a current display time of the video, and may identify a frame that is to be displayed at the current display time. The video mentor 110 typically identifies a frame that has not already been queued for decode or display, based on an internally maintained indication of what frames have been loaded, queued, decoded, and displayed. The video mentor 110 may identify the frame based on information included in the sample table 150. In addition, the video mentor 110 may identify the frame based on an indication of a most recently queued non-droppable frame, a most recently decoded non-droppable frame, a most recently displayed frame.

The frame that is identified may depend on the manner in which the video is being displayed. For example, when a user is enabled to step through the video, the frame to be displayed may be a frame at a particular position within the video that has been identified by the user. When the video is being played forwards, the video mentor identifies a frame with a lowest display time in a range extending from the current display time to a target display time, which is greater than the current display time. The video mentor attempts to prepare frames with display times between the current display time and the target display time for display such that those frames are ready to be displayed before the frames actually are displayed. Similarly, when the video is being played in reverse, then the video mentor identifies a frame with a highest display time in a range extending from the current display time to the target display time, which is less than the current display time in this case.

The video mentor 110 identifies frames of the video upon which the identified frame depends (320). The video mentor 110 may identify the frames based on one or more assumptions. For example, the video mentor may assume that the frames will be decoded correctly when decoded in an order indicated by the sample numbers of the frames. Furthermore, the video mentor 110 assumes that no frames depend on droppable frames, and that no frames depend on a frame that was decoded before a previously decoded sync sample, or before a partial sync threshold number of previous partial sync frames. In one implementation, the video mentor 110 identifies only the frames upon which the identified frame depends that have not yet been decoded. The video mentor may identify the frames using the sample table 150. In other implementations, video mentor 110 might not identify the exact dependencies of the frame to be displayed, as such dependencies may be complicated, and only need to be identified by a codec that will be used to decompress the frame to be displayed. Instead, the video mentor 110 identifies and queues the frames upon which a frame might depend on such that the frames are available to be used to decode the frame, if needed.

If the frame to be displayed is a sync frame, then the frame does not depend on any other frames. Otherwise, video mentor identifies an effective base sample and an effective sync sample for the frame to be displayed. The effective base sample may be the most recently queued non-droppable sample as indicated by an internal indication of what frames have been loaded, queued, decoded, and displayed. If a non-droppable sample has not been queued, then the effective base sample may be the most recently decoded sample, if a sample has been decoded, or a most recently displayed sample.

The effective sync sample may be the first frame upon which the frame to be displayed may depend. For example, the effective sync sample may be a previous sync frame. The effective sync sample also may be a first partial sync frame from which the frame may depend. The first partial sync frame may be a number that is equal to the partial synch threshold indicated by the sample table 150 for the frame of partial sync frames before the frame. The effective sync sample also may be the gradual decoder refresh sync point. Frames decoded after a frame at the gradual decoder refresh sync point may not depend on another frame before the gradual decoder refresh sync point. In typical implementations, the gradual decoder refresh sync point identifies a number of frames decoded before a particular frame upon which the particular frame may depend. For example, the gradual decoder refresh sync point may indicate that a particular frame may depend only on ten previously decoded frames.

If the effective base sample has a larger sample number than the effective sync sample, then some of the frames upon which the frame to be displayed depends have already been queued for decode or display. Consequently, those frames do not need to be queued again. However, if the effective sync sample has a larger sample number, then none of the frames upon which the frame to be displayed depends have been queued for decode or display. Furthermore, none of the frames upon which the frame to be displayed depends have been queued when the sample number of the effective base sample is greater than the sample number of the frame to be displayed. In such cases, all of the frames upon which the frame to be displayed depends need to be queued for decode or display.

In some implementations, rather than identifying a first frame to be displayed (315), the video mentor 110 may identify a first frame to be decoded among the frames with a display time in the range between the current display time and the target display time. However, such an identification requires identification of all of the frames upon which the frames with display times in the range, as well as the decode times of those frames. Furthermore, identifying the frames upon which the identified frame depends (320) typically identifies the first frame to be decoded, due to the structure of the dependencies between the frames. Therefore, identifying the first frame to be displayed and the frames upon which that frame depends typically is sufficient to properly decode the video.

The video mentor 110 signals for the identified frames to be loaded in an order indicated by the sample numbers of the identified frames (325). More particularly, the video mentor 110 receives a request for one or more frames to be loaded from the data handler 125, and the video mentor 110 instructs the data handler 125 to load the frames into active memory. The video mentor 110 communicates with the data handler through the communications interface 112 of the video media handler 105. The video mentor 110 receives one or more messages indicating that the frames have been loaded (330). The video mentor 110 may receive the messages from the communications interface 112, which receives the message from the data handler 125.

Once the frames have been loaded, the video mentor 110 signals for the frames to be queued for decode or display in an order indicated by the sample numbers of the identified frames (335). In one implementation, the video mentor 110 only queues the frames that have not been queued already, as indicated by an internal indication of the frames have been loaded, queued, decoded, and displayed. More particularly, the video mentor 110 receives a request for one or more frames to be queued from the image compression manager 120, and the video mentor 110 instructs the image compression manager 120 to queue the frames. The video mentor 110 communicates with the image compression manager 120 through the communications interface 112 of the video media hander 105. The image compression manager 120 queues the frames to be decoded with one of the image codecs 115. In one implementation, the video mentor queues the frames at a time that allows the frames to be decoded before the frames are to be displayed, and that allows other frames that depend on the frames to be decoded before the other frames are to be displayed.

For each frame that is to be queued, the video mentor 110 determines whether the frame is to be displayed within a range of time extending from the current display time to a final display time. For example, if the video is being played forwards, then the video mentor 110 may determine whether the frame is to be displayed between the current display time and the end of the video, or the end of a section of the video that is currently being displayed. If the user is controlling playback, then the final display time may equal the current display time such that the range has no width. The range typically includes the target display time that is used when identifying the frames to be decoded. If the frame is to be displayed within the range, then the frame is queued for decode and display. If the frame is not to be displayed within the range, then the frame is queued for decode only. If the frame is droppable, then the frame is queued for decode and display if the frame is to be displayed. Otherwise, the frame is not queued. If the frame is not droppable, then the frame is queued for decode and display, unless the frame has already been decoded but not displayed, and only if no non-droppable frames with higher sample numbers have been decoded. If the frame has been decoded but not displayed, then the frame may be queued for display only. If non-droppable frames with higher sample numbers have been decoded, then the frame might not be queued in order to prevent the frame from being decoded based on incorrect dependencies.

The video mentor 110 signals for the frames to be decoded for display in advance of when the frames are needed for display. For example, the video mentor 110 may signal for the frames to be decoded such that each frame is decoded and ready for display one second before the frame is to be displayed. Decoding a frame for display in advance of when the frame is needed eliminates a delay between when the frame should be delayed and when the frame actually is displayed that results from the frame being decoded.

After queuing the frames upon which the frame to be displayed depends, the video mentor 110 may identify a different frame to be displayed (315). In forward and backward playback, the different frame may be the next frame to be displayed in the direction of playback. If the user is controlling playback, the different frame may be another frame selected by the user for display. The frames upon which the different frame depends may be identified (320), and those frames may be loaded (325) and queued (330). In some cases, one or more of the frames upon which the different frame depends may not be loaded and queued, for example, if the frames have been loaded or queued already for another frame to be displayed. In this manner, the frames of the video are sequentially loaded and queued for decode and display such that the frames are ready to be displayed before they are needed for display. In one implementation, the video mentor 110 maintains a cache indicating the frames that have been loaded and queued for display to inform later loading and queuing operations. For example, if the video is being played forwards, then the video mentor may use information indicating that frame 5 has been identified previously for display to identify a frame that is displayed immediately after frame 5 as the next frame to be displayed. Indications of frames that have been identified for display may be cached for frames with display times between the current display time and the target display time. Caching an indication of the frames that have been loaded and queued may eliminate some processing of the video, which enables the video mentor 110 to operate more efficiently. The cached indications may be cancelled in response to, for example, a change in the direction of playback or canceling of the display of one or more frames.

The video mentor 110 receives one or more messages indicating that the frames have been queued (340). The video mentor 110 may receive the messages from the communications interface 112, which receives the message from the image compression manager 120. In addition, the video mentor 110 may receive one or more messages indicating that the frames have been decoded from the image compression manager 120 through the communications interface 112 (345). The image compression manager 120 may send such messages after the frames have been decoded with one of the codec 115. The image compression manager may access a sample table of the video, such as the sample table 150 of FIG. 1A, to identify the dependencies between the queued frames, such that the dependencies may be considered when decoding the queued frames.

The video mentor 110 also may receive one or more messages from the image compression manager 120 indicating that the decoded frames have been displayed (350). The image compression manager 120 may send such messages after passing the decoded frames to the display module 130. The image compression manager 120 also may send the messages after the image compression manager 120 receives an indication that the frames have been displayed from the display module 130. In implementations where the video is being played regularly, the frames may be displayed for predefined amounts of time. In implementations where a user is controlling display of the video, the frames may be displayed until a request to display a different frame is received from the user.

The video mentor 110 may maintain internal indications of the states of the frames in the decoding and displaying process, and the video mentor 110 may update the internal indications based on the messages exchanged with the data handler 125, the image compression manager 120, and the display module 130. In one implementation, the video mentor 110 may wait for confirmed completion of a previous request, which is indicated by an updated state for a frame for which the previous request was submitted, before submitting a subsequent request. For example, the video mentor 110 may wait for confirmation from the data handler 125 that a particular frame has been loaded before signaling for the image compression manager 120 to queue the particular frame for decode or display. As another example, when the video mentor needs to queue a first frame and a second frame, the video mentor may wait for confirmation that the first frame has been queued before signaling for the second frame to be queued. In some implementations, if confirmation of a previous request is not received within a particular amount of time, the video mentor 110 may submit the request again. As another example, the video mentor 110 may use the internal indications of the states of the frames such that, for example, the video mentor 110 does not signal for a frame to be loaded or queued multiple times after confirmed completion of a previous loading or queuing request for the frame. In one implementation, the state information informs the selection of the frames to be decoded and displayed by the video mentor 110. In another implementation, after a frame will no longer be displayed or used to decode another frame, the video mentor 110 may stop maintaining the internal indication of the state of the frame. Accordingly, in one implementation, the video mentor 110 only maintains indications of the state of frames that are, or are expected to be, queued, decoded, displayed, or used to decode other frames.

Figure 4A:
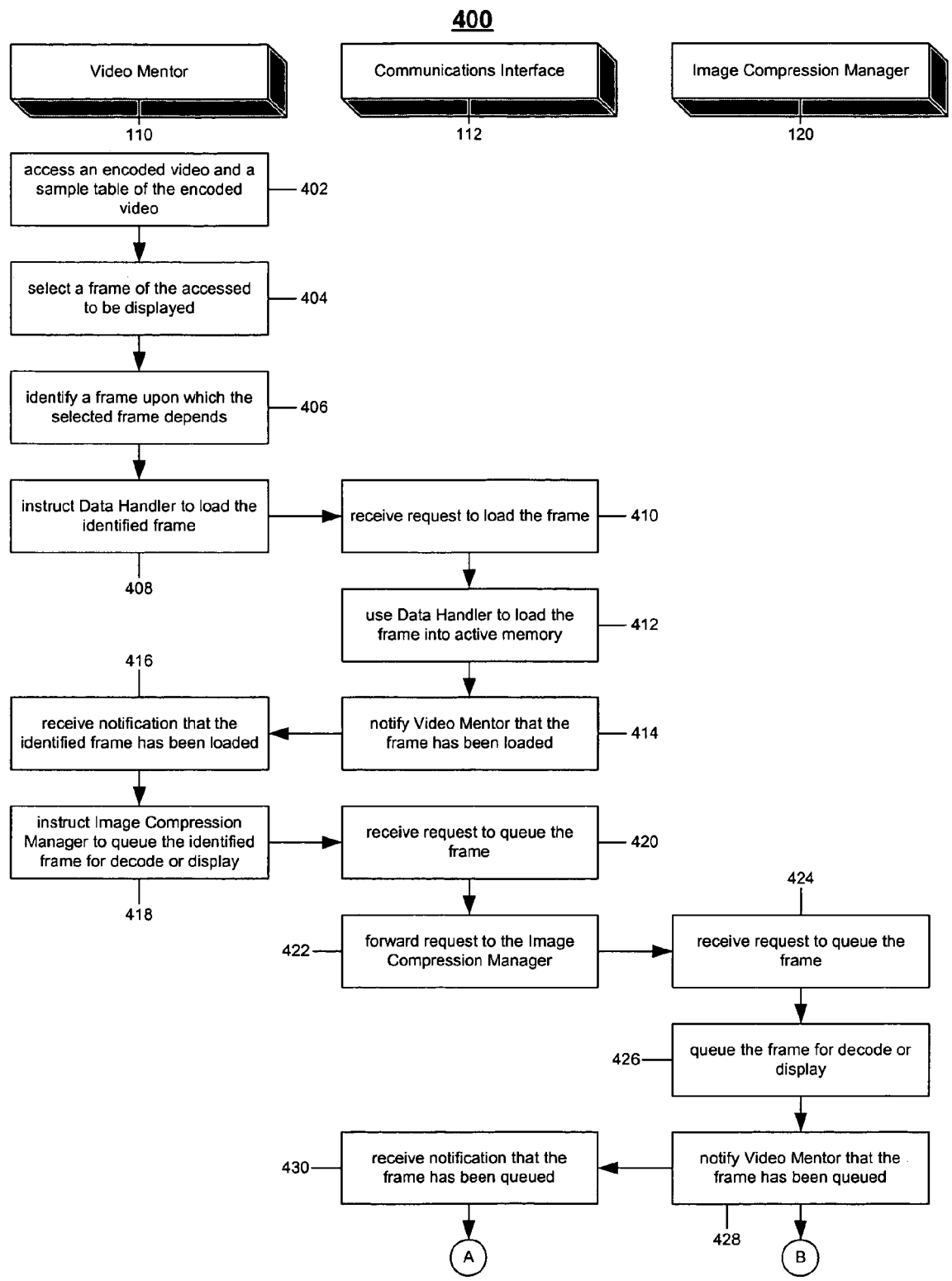
FIGS. 4A and 4B are a flow chart of a process for displaying a video.
Figure 4B:
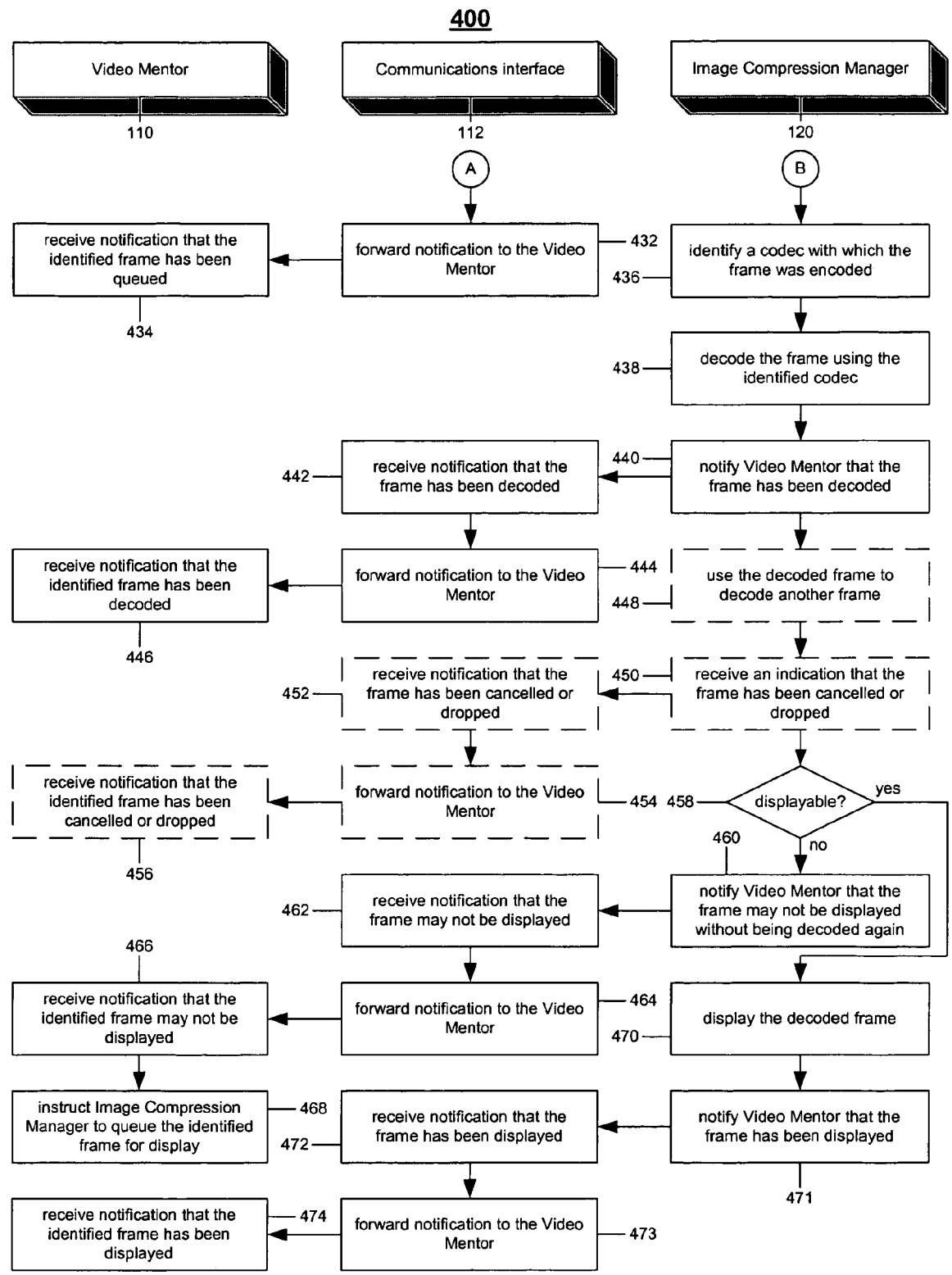

Referring to FIGS. 4A and 4B, a process 400 is executed by components of the video playback application 100, to display a video. The process 400 involves a video mentor 110, a communications interface 112, and an image compression manager 120 that are similar to corresponding components of FIG. 1. The video mentor 110, the communications interface 112, and the image compression manager 120 collectively decode and display frames of a video in a proper order for high quality playback of the video. The video mentor 110, the communications interface 112, and the image compression manager 120 also exchange messages regarding the status of the frames of the video. The process 400 illustrates operations performed by the video mentor 110, the communications interface 112, and the image compression manager 120 when decoding and displaying a single frame of the video.

The video mentor 110 begins by accessing an encoded video and a sample table of the encoded video (402), selecting a frame of the accessed video to be displayed (404), and identifying a frame upon which the selected frame depends (406). The video mentor 110 may do so as described with respect to the process 300 of FIG. 3. The video mentor 110 requests that the identified frame be loaded (408). The communications interface 112 receives the request to load the frame (410) and uses a data handler, such as the data handler 125 of FIG. 1, to load the frame into active memory (412). More particularly, the communications interface 112 forwards the request to the data handler and waits for an indication that the frame has been loaded from the data handler. The communications interface 112 sends the video mentor 110 a notification that the frame has been loaded (414), and the video mentor 110 receives the notification that the identified frame has been loaded (416). The video mentor 110 may update an internal indication of a state of the frame based on the received notification.

The video mentor instructs the image compression manager 120 to queue the identified frame for decode or display (418). The communications interface 112 receives the request to queue the frame (420) and forwards the request to the image compression manager 120 (422). The image compression manager 120 receives the request (424) and queues the frame for decode or display (426). The image compression manager 120 also notifies the video mentor that the frame has been queued (428). The communications interface 112 receives the notification (430) and forwards the notification to the video mentor 110 (432). The video mentor 110 receives the notification that the identified frame has been queued (434), and may update an internal indication of a state of the frame based on the received notification.

The image compression manager 120 identifies a codec with which the frame was encoded based on information associated with the frame. The image compression manager 120 decodes the frame using the identified codec (438), and notifies the video mentor 110 that the frame has been decoded (440). The communications interface 112 receives the notification (442) and forwards the notification to the video mentor 110 (444). The video mentor 110 receives the notification that the identified frame has been decoded (446), and may update an internal indication of a state of the frame based on the received notification.

The image compression manager 120 may use the decoded frame to decode another frame (448). For example, a second frame that depends on the decoded frame may be being decoded, so the image compression manager 120 may use the decoded frame when decoding the second frame.

The image compression manager 120 may receive an indication that the frame has been cancelled or dropped (450). For example, the image compression manager may receive an indication that playback of the video has been stopped, or that the direction of the playback has been reversed. As a result, the frame may not be displayed, so the frame is dropped from a queue of frames to be displayed. The image compression manager 120 may notify the video mentor 110 that the frame has been dropped. In such a case, the communications interface 112 may receive the notification (452), and may forward the notification to the video mentor 110 (454). The video mentor 110 may receive the notification that the identified frame has been dropped (456), and may update an internal indication of a state of the frame based on the received notification.

The image compression manager 120 determines whether the frame is displayable (458). In other words, the image compression manager determines whether sufficient buffer space exists to store the frame until the frame is to be displayed. If the frame is not displayable, then the frame must be decoded again before being displayed. In such a case, the image compression manager 120 notifies the video mentor 110 that the frame may not be displayed without being decoded again (460). The communications interface 112 receives the notification (462), and forwards the notification to the video mentor 110 (464). The video mentor 110 receives the notification that the identified frame may not be displayed (466), and may update an internal indication of a state of the frame based on the received notification. In addition, the video mentor may instruct the image compression manager 120 through the communications interface 112 to queue the identified frame for display (468), as was done originally (418). In typical implementations, the video 110 mentor only instructs the image compression manager 120 to queue the identified frame for display a second time when the video is being played in reverse.

If the frame is displayable (458), then the image compression manager 120 displays the decoded frame (470). For example, the image compression manager 120 may pass the frame to a display module, such as the display module 130 of FIG. 1. The display module may cause the frame to be displayed, and may notify the image compression module 120 that the frame has been displayed. In turn, the image compression manager 120 notifies the video mentor 110 that the frame has been displayed (471). The communications interface 112 receives the notification (472), and forwards the notification to the video mentor 110 (473). The video mentor 110 receives the notification that the identified frame has been displayed (474), and may update an internal indication of a state of the frame based on the received notification. In some implementations, the identified frame is buffered and displayed at an appropriate time that is indicated by the display time of the identified frame, rather than immediately after the identified frame has been decoded and identified as displayable.

Figure 4C:
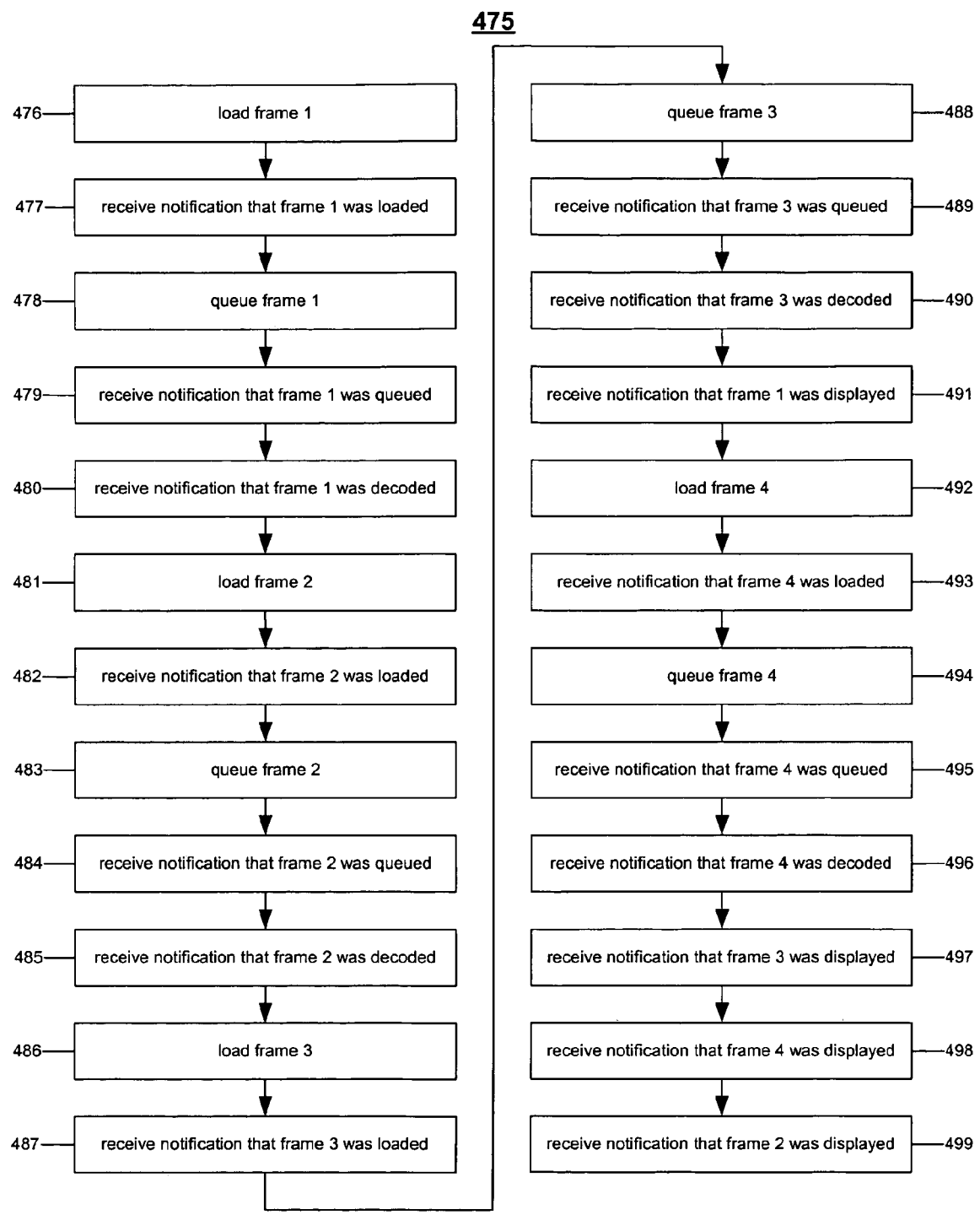
FIG. 4C is a flow chart of a process for queuing frames of a video that includes four frames for decode and display.

Referring to FIG. 4C, a process 475 is used to queue four frames of a video for decode and display. The process 475 is executed by the video mentor 110. The first frame of the video is an I-frame, the second frame of the video is a P-frame that depends on the first frame, and the third and fourth frames are B-frames that depend on the first and second frames. Therefore, the decode order of the video is frame 1, frame 2, frame 3, and frame 4, while the display order is frame 1, frame 3, frame 4, and frame 2, which indicates that the video is not the video 200 of FIG. 2. Each of the frames is to be displayed for one second. The video mentor 110 maintains a one second look-ahead, such that a next frame is ready for display before a previous frame is displayed.

Each of the operations 476-499 of the process 475 may involve communication between the video mentor 110 and other components of the video playback application. For example, when loading a frame, the video mentor 110 may instruct the data handler 125 to load the frame through the communications interface 112. As another example, when queuing a frame, the video mentor 110 may instruct the image compression manager 120 to queue the frame through the communications interface 112. In addition, notifications of completed actions from the other components may be received by the video mentor 110 through the communications interface 112 after the other components have completed the actions. Such communications are not indicated by the process 475 for simplicity.

As the video mentor 110 queues frames for decode and display, the video mentor 110 maintains an indication of the state of the decoding process. The video mentor 110 updates the state based on the instructions sent by the video mentor 110 and the notifications received by the video mentor 110. The video mentor 110 views frames that have been queued as pending transactions that may be completed individually, or cancelled as a group. When the video mentor 110 directs new frames to be queued, the video mentor conditions those directions on the projected future state, which is the current state after applying the effects of decoding other previously queued frames in order.

In order to display the video, the video mentor 110 first loads frame 1 (or simply instructs that frame 1 should be loaded) (476). After receiving a notification that frame 1 has been loaded (477), the video mentor 110 queues frame 1 (or simply instructs that frame 1 should be queued) (478). The video mentor 110 receives a notification that frame 1 has been queued (479). The video mentor 110 also may receive a notification that frame 1 has been decoded (480). Alternatively, the video mentor 110 may receive the notification that frame 1 has been decoded later, for example, after frame 2 has been loaded. The video mentor 110 typically receives the notification any time after receiving the notification that frame 1 has been queued.

The video mentor 110 then loads frame 2 (481). The video mentor 110 may load frame 2 only after a notification has been received that frame 1 has been loaded. The video mentor 110 subsequently receives a notification that frame 2 has been loaded (482), and queues frame 2 (483). The video mentor 110 may signal for frame 2 to be queued only after receiving notification that frame 1 has been queued. The video mentor 110 receives a notification that frame 2 has been queued (484). The video mentor 110 also may receive a notification that frame 2 has been decoded (485). Alternatively, the video mentor 110 may receive the notification any time after receiving the notification that frame 2 has been queued.

The video mentor 110 then loads frame 3 (486). After receiving a notification that frame 3 has been loaded (487), the video mentor 110 queues frame 1 (488). The video mentor 110 receives a notification that frame 3 has been queued (489). The video mentor 110 also may receive a notification that frame 3 has been decoded (490).

Now that frame 3 has been decoded, a one second look-ahead has been established. In other words, a frame that is to be displayed after frame 1 (i.e., frame 3) is ready for display, so frame 1 may be displayed. The video mentor 110 receives a notification that frame 1 has been displayed (491). In general, frames are decoded in the order in which they are queued, and displayed at times indicated by their display times.

To maintain the look-ahead, the video mentor 110 prepares frame 4 for display before frame 3 is to be displayed. More particularly, the video mentor 110 loads frame 4 (492). The video mentor 110 subsequently receives a notification that frame 4 has been loaded (493), and queues frame 4 (494). The video mentor 110 receives a notification that frame 4 has been queued (495). The video mentor 110 also may receive a notification that frame 4 has been decoded (496).

At this point, frames 1-4 have been decoded, and frame 1 is being displayed, while frames 2, 3, and 4 are ready for display. Those frames are displayed in the display order, and the video mentor 110 receives a notification that frame 3 was displayed (497), a notification that frame 4 was displayed (498), and notification that frame 2 was displayed (499).

Figure 5:
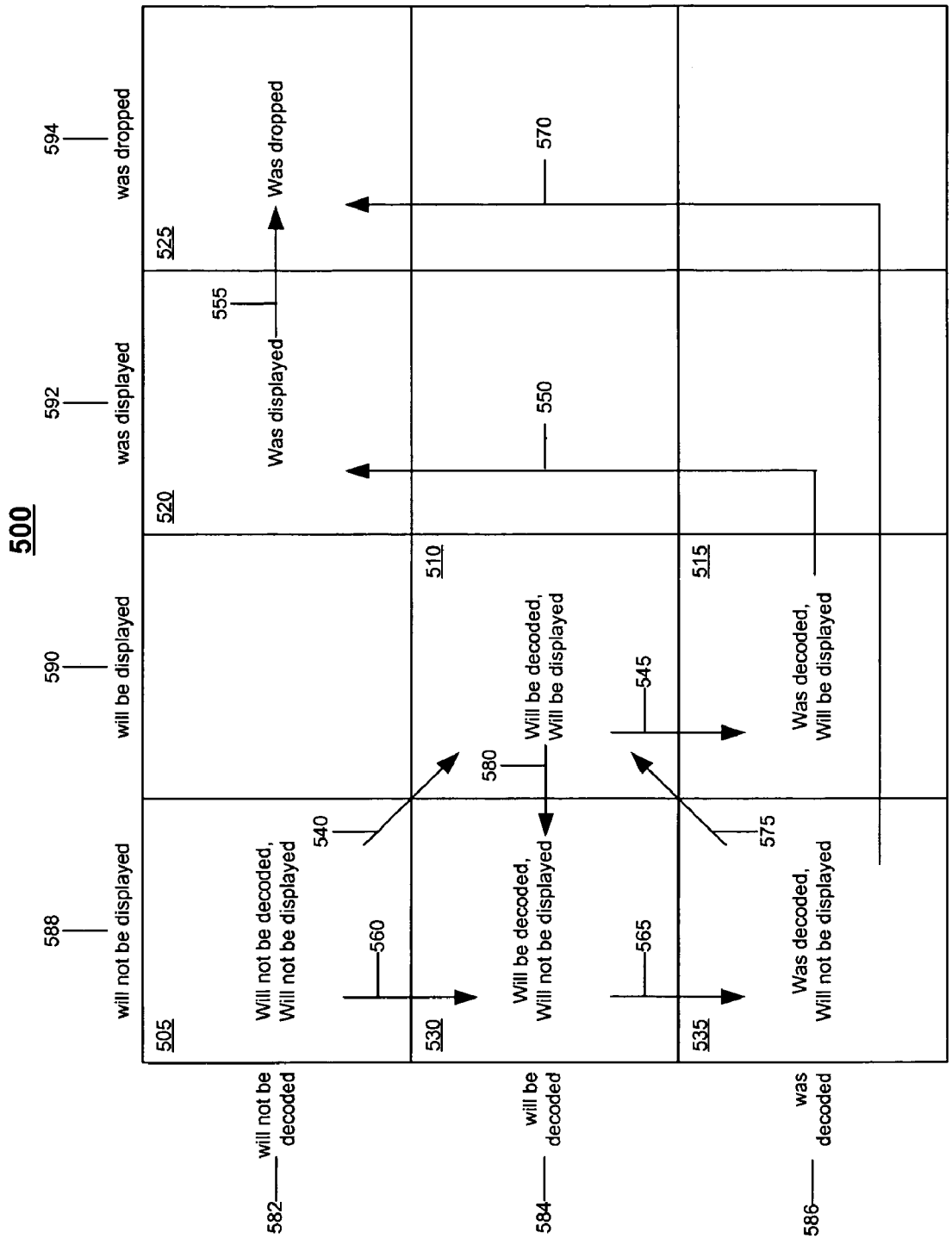
FIG. 5 is an illustration of possible states of a frame of a video when being decoded and displayed.

Referring to FIG. 5, a state diagram 500 is shown. The video mentor 110 queues frames of a video for decode and display. After the video mentor 110 queues a particular frame, it maintains an indication of the state of the frame. If the video mentor 110 queues a frame multiple times, the video mentor 110 maintains an independent indication of the state of the frame for each time the frame was queued. The indication of the state of the frame may be used by the video mentor 110 to inform decisions regarding loading and queuing of frames of the video. The frame may occupy seven states 505-535, and transitions 540-570 indicate how the state of the frame may change. The video mentor updates the state of the frame based on messages regarding the frame that are exchanged with an image compression manager, such as the image compression manager 120 of FIG. 1.

The state diagram 500 distributes the states 505-535 among three rows 582, 584, and 586. Each of the rows 582, 584, and 586 corresponds to whether or not the frame will be decoded and are mutually exclusive. For example, the frame occupies one of the states 530 and 510 along the row 584 when the frame has been queued for decode and will be decoded, and the frame occupies one of the states 535 and 515 along the row 586 when the frame has been decoded already. The frame occupies one of the states 505, 520, or 525 along the row 582 when the frame will not be decoded, or when the frame has not yet been queued for decode.

Similarly, the state diagram 500 distributes the states 505-535 among four columns 588, 590, 592, and 594. Each of the columns 588, 590, 592, and 594 corresponds to whether or not the frame will be displayed, and the columns are mutually exclusive. For example, the frame occupies one of the states 510 and 515 along the column 590 when the frame has been queued for display and will be displayed, and the frame occupies the state 520 in the column 592 when the frame has been displayed already. The frame occupies the state 525 in the column 594 when the frame was to have been displayed at one time, but will no longer be displayed. The frame occupies one of the sates 505, 530, and 535 along the column 588 when the frame will not be displayed, when the frame has been cancelled or dropped, or when the frame has not yet been queued for display.

Whether or not the frame will be decoded is independent of whether or not the frame will be displayed. Therefore, whether or not the frame will be decoded and whether or not the frame will be displayed identify one of the states 505-535 that the frame occupies. In other words, each of the seven states 505-535 corresponds to a status of the frame as the frame is being decoded and a status of the frame as the frame is being displayed. Particular combinations of decode status and display status do not represent a valid state that the frame may occupy, as evidenced by the state diagram including seven valid states 505-535 out of twelve possible combinations.

Each of the seven states 505-535 corresponds to a status of the frame as the frame is being decoded and displayed. For example, a frame occupies state 505 when the frame has not yet been queued for decode, which signifies that the frame has not been queued for display either. State 510 indicates that the frame has been queued for decode and display. In other words, a frame that occupies state 510 will be decoded and will be displayed. State 515 indicates that a frame has been decoded and has been queued for display. In other words, a frame that occupies state 515 has been decoded and will be displayed. State 520 indicates that a frame has been seen, which means that the frame has been decoded (and will not be decoded again) and has been displayed. State 525 indicates that a frame is finished as a result of being dropped (which indicates that the frame will not be decoded or displayed), or after the frame has been displayed.

State 530 corresponds to a frame that has been queued for decode but that is not displayable and will not be displayed. A frame may be in state 530 when the frame will be used only to decode another frame, or when sufficient buffer space does not exist to maintain the frame for display. A frame that occupies state 530 will be decoded, but will not be displayed. State 535 indicates that a frame has been decoded and that the frame is not displayable. In other words, a frame that occupies state 530 has been decoded, but will not be displayed.

Transition 540 may be made when the video mentor sends a message to the image compression manager indicating that the frame should be queued for decode and display. Alternatively, the transition may be made when the video mentor receives a message from the image compression manager indicating that the frame has been queued. Transition 545 may be made in response to a message from the image compression manager indicating that the frame has been decoded. Transition 550 may be made in response to a message from the image compression manager indicating that the frame has been displayed. Transition 555 may be made after the frame has been displayed for an amount of time indicated by a sample table of the video.

Transition 560 may be made when the video mentor sends a message to the image compression manager indicating that the frame should be queued for decode only. Alternatively, the transition may be made when the video mentor receives a message from the image compression manager indicating that the frame has been queued. Transition 565 may be made in response to a message from the image compression manager indicating that the frame has been decoded. Transition 570 may be made after a message indicating that a frame that depends on the frame has been decoded is received from the image compression manager.

Transition 575 may be made when the video mentor sends a message to the image compression manager indicating that the frame should be queued for decode and display after the image compression manager notified the video mentor that the frame is not displayable without being decoded again. Alternatively, the transition may be made when the video mentor receives a message from the image compression manager indicating that the frame has been queued. Transition 580 may be made in response to a message from the image compression manager indicating that sufficient buffer space does not exist for the frame to be displayed without being decoded again.

In addition, a transition from one of states 505, 510, 515, 520, 530, and 535 to state 525 may be made in response to an indication that a frame has been cancelled or dropped. For example, playback of the video may be stopped or reversed by a user, which may cancel or drop display of the frame.

Users may desire to play video content forwards and backwards at a variety of speeds. Users also may desire to jump to particular points within the video content. Such features may be particularly useful when playing and editing the video content. However, videos frames typically are compressed for optimal decompression under forward playback. Consequently, decompressing a video for reverse or speed-modified playback may be difficult and resource intensive.

A frame is buffered when the frame is (a) going to be displayed, or (b) going to be needed to decode other frames. When neither condition (a) nor condition (b) are true, the frame may be removed from the buffer. During forward playback, condition (a) and condition (b) become true at somewhat similar times, and become false at somewhat similar times. However, during reverse playback, condition (b) typically becomes true well in advance of condition (a), and condition (a) typically becomes false well after condition (b). Consequently, under reverse playback, some frames may be buffered for a relatively long time. In other words, reverse playback often requires a lot of buffer space.

Figure 6:
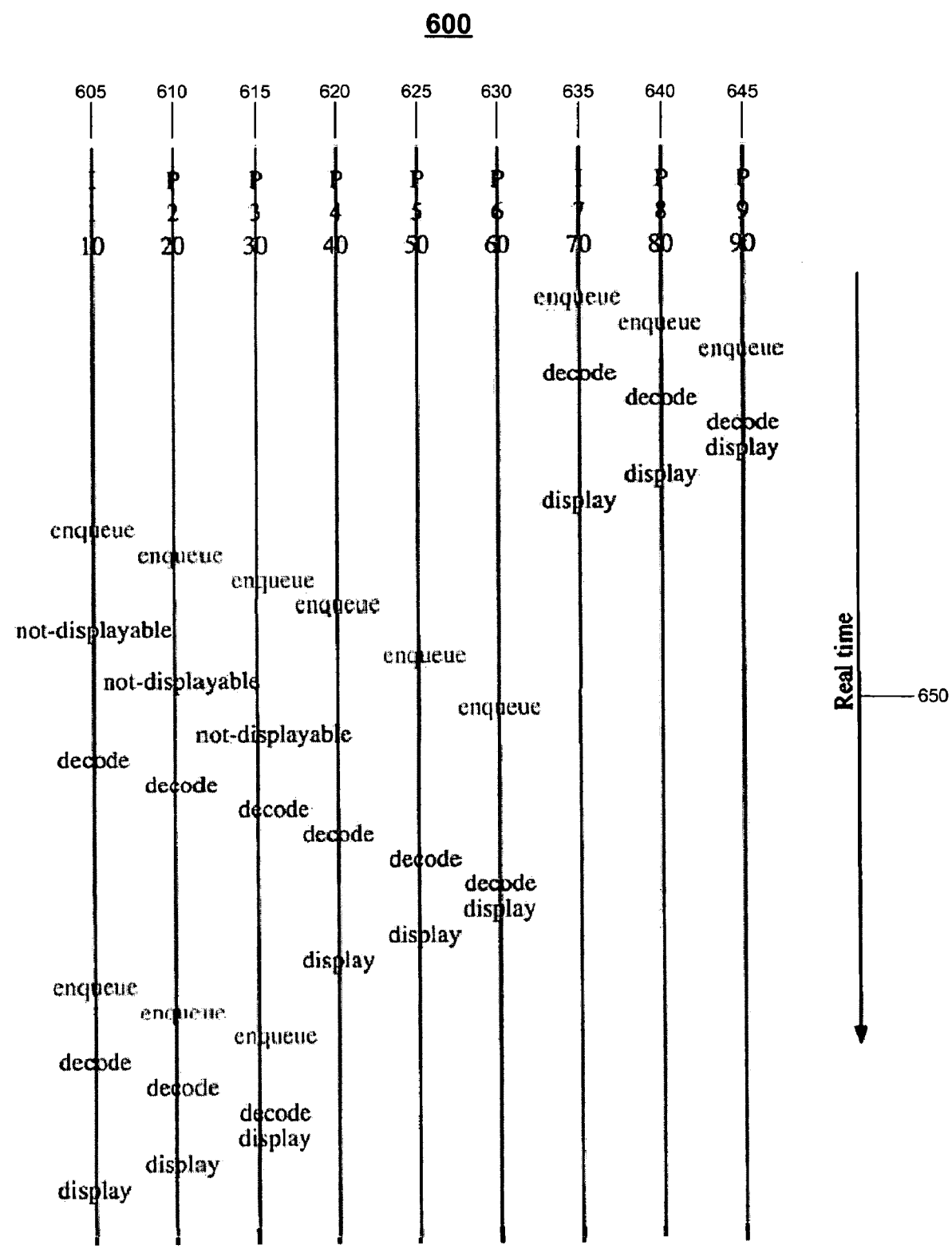
FIG. 6 is an illustration of frame queuing and decoding operations when playing a video in reverse.

Referring to FIG. 6, a timeline 600 indicates how a video may be played in reverse. More particularly, the timeline 600 illustrates messages passed between the video mentor 110 and the image compression manager 120 to play the video in reverse. The messages result in the queuing, decoding, and displaying of nine frames included in the video. The nine frames include an I-frame 605 (frame 1), a P-frame 610 (frame 2), a P-frame 615 (frame 3), a P-frame 620 (frame 4), a P-frame 625 (frame 5), a P-frame 630 (frame 6), an I-frame 635 (frame 7), a P-frame 640 (frame 8), and a P-frame 645 (frame 9). Each of frames 2-6 depend on frame 1, and on others of frames 2-6 that come before it. Each of frames 8 and 9 depends on frame 7, and frame 9 also depends on frame 8. Messages that appear below one of the frames 605-645 are messages that are sent in relation to the frame.

A time axis 650 indicates an order in which the messages are sent. More particularly, a first message that appears above a second message indicates that the first message is sent before the second message.

The video playback application is capable of buffering two frames that have been decoded for use in decoding other frames or for later display. Each of the frames 605-645 is to be displayed for 10 seconds, so playing the frames 605-645 forwards and backwards takes 90 seconds.

Messages labeled "enqueue" are sent by the video mentor 110 to instruct the image compression manager 120 to queue corresponding frames for decode and display. Messages labeled "decode" are sent by the image compression manager 120 to inform the video mentor 110 that corresponding frames have been decoded. Messages labeled "display" are sent by the image compression manager 120 to indicate that corresponding frames have been displayed. The image compression manager 120 sends messages labeled "not displayable" to the video mentor 110 to indicate that corresponding frames may not be displayed without being queued for decode and display again. In other words, sufficient space does not exist to buffer the corresponding frames long enough after decoding for display.

When playing the video in reverse, frame 9, which depends on frames 7 and 8, is to be displayed first, as indicated by a current display time that is accessible to the video mentor 110 and the image compression manager 120. Frames 7, 8, and 9 are queued and decoded, and frame 9 is displayed. Frames 7 and 8 were buffered after being decoded, and are later displayed in reverse order having been decoded only once.

Frame 6, which depends on frames 1-5, is the next to be displayed. Frames 1-6 are queued and decoded, and frame 6 is displayed. Frames 4 and 5 are buffered and are later displayed without being decoded again. However, sufficient buffer space does not exist to buffer frames 1-3, so the image compression manager 120 notifies the video mentor 110 that those frames need to be decoded again before being displayed. The image compression manager 120 provides this notification by sending "not displayable" messages to the video mentor 110. The video mentor 110 queues frames 1-3, and those frames are displayed in reverse similarly to how frames 7-9 were displayed in reverse. As a result, the 9 frames of the video are displayed in reverse.

The time axis 650 is not to scale. Therefore, even though there appears to be a large amount of time between when frame 7 is displayed and when frame 6 is displayed, those frames are displayed such that there is not a noticeable break or delay between the frames. In other words, frames 1-6 may be queued earlier than illustrated, perhaps before some of frames 7, 8, and 9 have been decoded and displayed, to ensure proper playback of frames 7 and 6.

Figure 7:
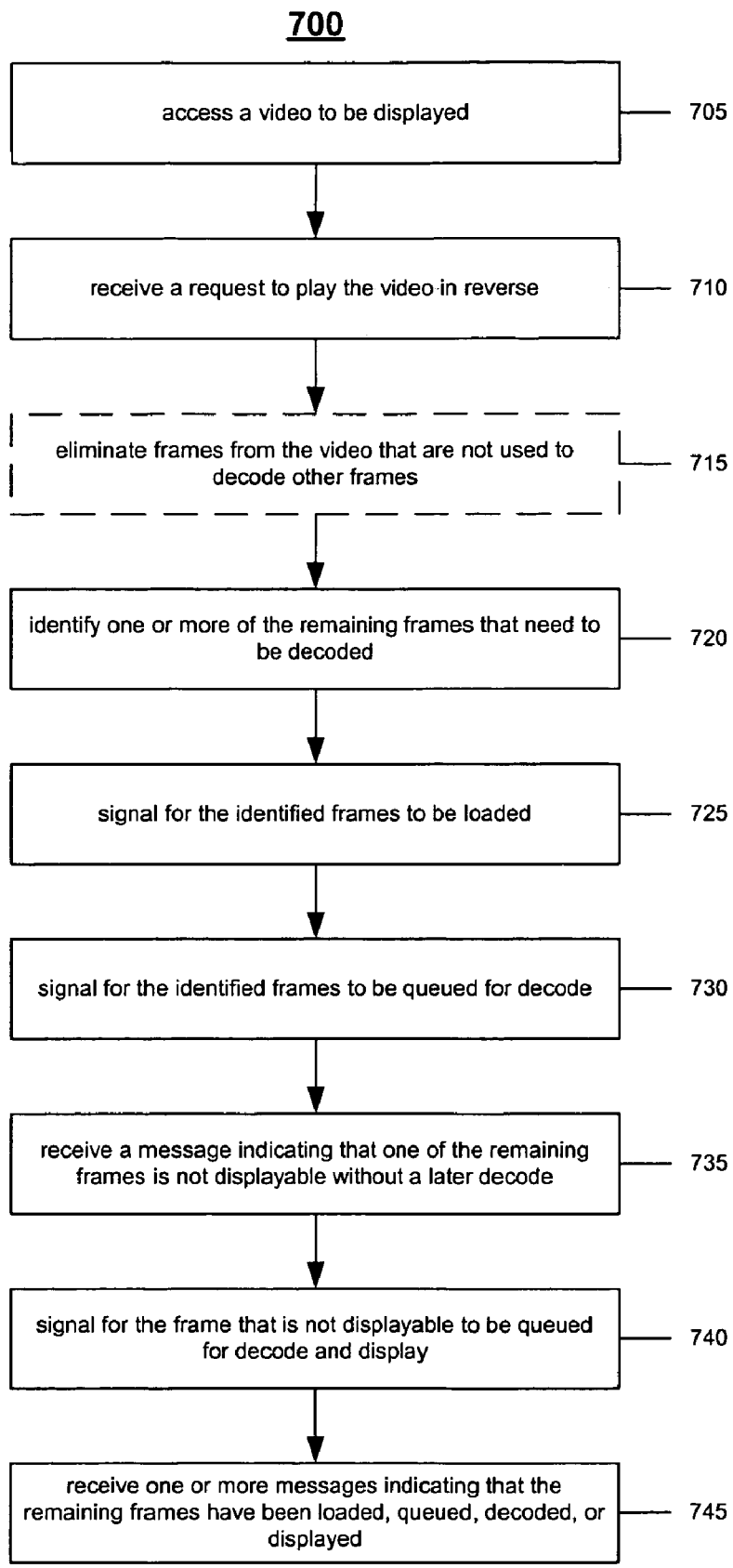
FIG. 7 is a flow chart of a process for queuing frames of a video for decode and display when the video is played in reverse.

Referring to FIG. 7, a process 700 is used to queue frames of a video for reverse playback. The process 700 is executed by the video mentor 110. The video mentor 110 loads and queues frames of the video such that the frames may be properly decoded and displayed in reverse order. The video mentor 110 may suggest the loading and queuing particular frames multiple times when the particular frames may not be buffered long enough to be displayed after being decoded. The video mentor 110 may eliminate some of the frames to more efficiently use buffer space and to avoid repeatedly buffering frames.

The video mentor 110 first accesses a video to be displayed (705). The video may include sync frames, partial sync frames, difference frames, and droppable frames. The video mentor 110 also may access other information describing the video, such as a sample table of the video that is similar to the sample table 150 of FIG. 1A. The sample table includes metadata describing the frames of the video, such as types of the frames, times at which the frames may be displayed, and amounts of times for which the frame may be decoded or displayed.

The video mentor 110 receives a request to play the video in reverse (710). The request may be generated by a user that is interacting with a user interface of a video playback application that includes the video mentor 110, such as the video playback application 100 of FIG. 1. For example, the user may select a button or a menu item provided by the user interface to generate the request.

In order to improve performance of the video playback application when playing the video in reverse, the video mentor 110 may eliminate frames from the video that are not used to decode other frames (715). In other words, the video mentor 110 may eliminate droppable frames from the video. Note that because the droppable frames are not used to decode any other frames, the frames would have been decoded only for display. Additionally, buffer space is not used to continue storing decoded and displayed frames that are used to decode the droppable frames. In other words, eliminating droppable frames enables frames upon which the droppable frames depend that have already been displayed to be removed from the buffer, which creates buffer space for frames that have not yet been displayed. The video mentor 110 may eliminate the droppable frames only when doing so does not overly degrade reverse playback of the video. For example, the video mentor 110 may eliminate the droppable frames only when the droppable frames represent a small percentage of the frames of the video, or only when the droppable frames occur once per second.

The video mentor 110 identifies one or more of the remaining frames of the video that need to be decoded to play the video in reverse (720). In addition, the video mentor 110 signals for the identified frames to be loaded (725), and signals for the identified frames to be queued for decode (730). The video mentor 110 may signal for the frames to be loaded and queued similarly to what is done in the process 300 of FIG. 3.

The frames are decoded in response to the signals from the video mentor 110. The decoded frames that are not to be displayed immediately are buffered for display. More particularly, the frames that are buffered in order of display time, with frames to be displayed earlier being buffered before frames to be displayed later. The size of the frame buffer may be limited, which may prevent all of the frames that have been decoded from being buffered for later display. As a result, some frames may need to be discarded, and those frames will need to be decoded again in order to be displayed.

The video mentor 110 receives a message identifying one or more frames that are not displayable without a later decode (735). In response to the message, the video mentor 110 signals for the identified frame, and other frames upon which the identified frame depends, to be queued again for decode and display (740). The video mentor 110 may delay re-queuing those frames such that the frames are queued in the right order. For example, the video mentor 110 may wait until all frames to be displayed before the identified frame have been queued, decoded, or displayed before re-queuing the identified frame and the frames upon which the identified frame depends. As another example the video mentor 110 may re-queue the identified frame and the frames upon which the identified frame depends before queuing frames to be displayed after the identified frame. Those frames are decoded and displayed or buffered, and the video mentor 110 may receive additional messages indicating that some frames are not displayable without being decoded again. In addition, the video mentor 110 may receive other messages indicating that the remaining frames have been loaded, queued, decoded, or displayed, such that the video mentor 110 may update internally maintained indications of the states of the remaining frames (745). In this manner, the video mentor 110 queues and re-queues the frames of the video such that the frames may be displayed in reverse order.

In some of the above described implementations, an order in which the frames of a video being displayed should be decoded may not be clearly indicated, for example, by identifiers assigned to the frames. In such a case, the video mentor 110 may identify the order in which the frames should be decoded. To do so, the video mentor 110 identifies dependencies between frames of the accessed video using a sample table for the video. In implementations where the video is being played in forward normal-play, the video mentor 110 may identify the dependencies of all frames of the video regardless of where playback is to begin. Alternatively, if forward normal-play is to begin at a point other than the beginning of the video, then the video mentor 110 may identify the dependencies of only those frames that will be displayed. In implementations where a user is controlling display of the video, the video mentor 110 may identify the dependencies of only a frame to be displayed. In some user-controlled implementations, the video mentor 110 also may identify the dependencies of a particular number of subsequent frames.

Based on the identified dependencies, the video mentor 110 identifies an order in which the frames of the video should be decoded. In implementations where the video is being played regularly, the identified order may include all frames of the video. Alternatively, the identified order may include frames that will be displayed and the frames upon which those frames depend. In implementations in which a user is controlling display of the video, the identified order may include the frame to be displayed and the frames upon which that frame depends. The identified order in user-controlled implementations also may include a particular number of subsequent frames and frames upon which the subsequent frames depend.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
accessing a video that includes a plurality of frames, one or more of the frames being decodable by one or more communicatively coupled decoders;
identifying a frame in the video that is to be displayed;
determining a plurality of dependency frames in the video upon which decoding of the frame to be displayed depends;
providing an indication that one or more associated dependency frames are to be decoded;
queuing the one or more associated dependency frames that have not already been queued; and
updating a frame state model based on the provided indication, the frame state model indicating, for each queued frame of the video, a decode status and a display status, wherein the decode status and the display status at least indicate whether the queued frame has been decoded and whether the queued frame has been displayed, said updating the frame state model including receiving respective messages indicating status transitions to the decode status and to the display status.

2. The method of claim 1 wherein providing an indication that one or more associated dependency frames are to be decoded comprises providing an indication that the one or more associated dependency frames are to be queued for decoding by one of the communicatively coupled decoders.

3. The method of claim 2 further comprising providing an indication that the frame to be displayed is to be queued for decoding by the one of the communicatively coupled decoders after the one or more associated dependency frames have been queued for decoding.

4. The method of claim 2 further comprising receiving one or more messages indicating that the one or more associated dependency frames have been queued.

5. The method of claim 1 further comprising providing an indication that the one or more associated dependency frames are to be loaded from a data store.

6. The method of claim 5 further comprising receiving one or more messages indicating that the one or more associated dependency frames have been loaded.

7. The method of claim 1 further comprising providing an indication that the frame to be displayed is to be loaded from a data store.

8. The method of claim 7 further comprising receiving one or more messages indicating that the frame to be displayed has been loaded.

9. The method of claim 1 wherein the one or more of the communicatively coupled decoders include an MPEG-2 codec and an MPEG-4 AVC/H.264 codec.

10. The method of claim 1 wherein the frame to be displayed is encoded using information included in the frame to be displayed and using information included in another frame included in the video that is to be displayed before or after the frame to be displayed.

11. The method of claim 1 wherein providing an indication that one or more associated dependency frames are to be decoded comprises providing an indication that the one or more associated dependency frames are to be queued for decoding by one of the communicatively coupled decoders to a manager of the one of the communicatively coupled decoders.

12. The method of claim 1 further comprising displaying the frame to be displayed.

13. The method of claim 1 wherein determining a plurality of dependency frames in the video upon which decoding of the frame to be displayed depends comprises determining the plurality of dependency frames based upon an indication of one or more other frames for which an indication that the other frames are to be decoded has been provided.

14. The method of claim 1 wherein providing an indication that one or more associated dependency frames are to be decoded comprises providing the indication to each of the decoders associated with the dependency frames.

15. The method of claim 1 wherein providing an indication that one or more associated dependency frames are to be decoded comprises providing the indication to a manager of the plurality of decoders.

16. The method of claim 1 wherein the device comprises a computer processor.

17. The method of claim 1 wherein the device comprises a video playback application.

18. The method of claim 1 wherein accessing a video comprises accessing a video that includes frames that have been reordered.

19. A method comprising:
accessing a video to be displayed, the video including two or more frames, a first frame of the two or more frames being encoded using information included in the first frame and information included in a second frame of the two or more frames that has a reverse-play display time after that of the first frame;
receiving a request to display the video in reverse-play;
determining that the first frame is to be displayed;
determining that the second frame was used to encode the first frame;
signaling for the second frame to be queued for decode;
signaling for the first frame to be queued for decode and display; and
updating a frame state model based on the signaling for the first frame and the signaling for the second frame, the frame state model indicating, for each queued frame of the video, a decode status and a display status, wherein the decode status and the display status at least indicate whether the queued frame has been decoded and whether the queued frame has been displayed, said updating the frame state model including receiving respective messages indicating status transitions to the decode status and to the display status.

20. A machine-readable storage device encoded with a computer program comprising instructions that, when executed by a processing apparatus, cause the processing apparatus to perform operations comprising:
receiving a video that includes a plurality of frames, one or more of the frames being decodable by one or more communicatively coupled decoders;
determining that a frame in the video is to be displayed;
determining a plurality of dependency frames in the video upon which decoding of the frame to be displayed depends;
providing an indication that one or more associated dependency frames are to be decoded;
queuing the one or more associated dependency frames that have not already been queued; and
updating a frame state model based on the provided indication, the frame state model indicating, for each queued frame of the video, a decode status and a display status, wherein the decode status and the display status at least indicate whether the queued frame has been decoded and whether the queued frame has been displayed, said updating the frame state model including receiving respective messages indicating status transitions to the decode status and to the display status.

21. The machine-readable storage device of claim 20 wherein providing an indication that one or more associated dependency frames are to be decoded comprises providing an indication that the one or more associated dependency frames are to be queued for decoding by one of the communicatively coupled decoders.

22. The machine-readable storage device of claim 21 further comprising instructions that, when executed by a processing apparatus, cause the processing apparatus to perform operations comprising:
providing an indication that the frame to be displayed is to be queued for decoding by the one of the communicatively coupled decoders after the one or more associated dependency frames have been queued for decoding.

23. The machine-readable storage device of claim 21 further comprising instructions that, when executed by a processing apparatus, cause the processing apparatus to perform operations comprising:
receiving one or more messages indicating that the one or more associated dependency frames have been queued.

24. The machine-readable storage device of claim 20 further comprising instructions that, when executed by a processing apparatus, cause the processing apparatus to perform operations comprising:
providing an indication that the one or more associated dependency frames are to be loaded from a data store.

25. The machine-readable storage device of claim 24 further comprising instructions that, when executed by a processing apparatus, cause the processing apparatus to perform operations comprising:
receiving one or more messages indicating that the one or more associated dependency frames have been loaded.

26. The machine-readable storage device of claim 20 further comprising instructions that, when executed by a processing apparatus, cause the processing apparatus to perform operations comprising:
providing an indication that the frame to be displayed is to be loaded from a data store.

27. The machine-readable storage device of claim 26 further comprising instructions that, when executed by a processing apparatus, cause the processing apparatus to perform operations comprising:
receiving one or more messages indicating that the frame to be displayed has been loaded.

28. The machine-readable storage device of claim 20 wherein the one or more communicatively coupled decoders include an MPEG-2 codec and an MPEG-4 AVC/H.264 codec.

29. The machine-readable storage device of claim 20 wherein the frame to be displayed is encoded using information included in the frame to be displayed and using information included in another frame included in the video that is to be displayed before or after the frame to be displayed.

30. The machine-readable storage device of claim 20 wherein providing an indication that one or more associated dependency frames are to be decoded comprises providing an indication that the one or more associated dependency frames are to be queued for decoding by one of the communicatively coupled decoders to a manager of the one of the communicatively coupled decoders.

31. The machine-readable storage device of claim 20 further comprising instructions that, when executed by a processing apparatus, cause the processing apparatus to perform operations comprising:
displaying the frame to be displayed.

32. The machine-readable storage device of claim 20 wherein determining a plurality of dependency frames in the video upon which decoding of the frame to be displayed depends comprises determining the plurality of dependency frames based upon an indication of one or more other frames for which an indication that the other frames are to be decoded has been provided.

33. The machine-readable storage device of claim 20 wherein providing an indication that one or more associated dependency frames are to be decoded comprises providing the indication to each of the decoders associated with the dependency frames.

34. The machine-readable storage device of claim 20 wherein providing an indication that one or more associated dependency frames are to be decoded comprises providing the indication to a manager of the one or more communicatively coupled decoders.

35. The machine-readable storage device of claim 20 wherein the device comprises a computer processor.

36. The machine-readable storage device of claim 20 wherein the device comprises a video playback application.

37. The machine-readable storage device of claim 20 wherein receiving a video comprises receiving a video that includes frames that have been reordered.

38. A system comprising:
a plurality of decoders, one or more of the decoders being configured to decode frames of a video that includes a plurality of frames; and
a video media handler communicatively coupled to the plurality of decoders, the video media handler being configured to access the video, identify a frame in the video that is to be displayed, determine a plurality of dependency frames in the video upon which decoding of the frame to be displayed depends, and provide an indication that one or more associated dependency frames are to be queued for decoding;
wherein the video media handler maintains a frame state model that indicates, for each queued frame of the video, a decode status and a display status, wherein the decode status and the display status at least indicate whether the queued frame has been decoded and whether the queued frame has been displayed, the video media handler updating the frame state model based on the provided indication, said updating the frame state model including receiving respective messages indicating status transitions to the decode status and to the display status.

39. The system of claim 38 further comprising an image compression manager that is configured to receive the indication that one or more associated dependency frames are to be queued for decoding and to provide the one or more associated dependency frames to one or more of the communicatively coupled decoders.

40. The system of claim 39 further comprising a data handler from which the video media handler and the image compression manager may access the video.

41. The system of claim 38 further comprising a display module that is configured to display the frame to be displayed.

42. A system comprising:
means for accessing a video that includes a plurality of frames, one or more of the frames being decodable by one or more communicatively coupled decoders;
means for determining a frame in the video that is to be displayed;
means for determining a plurality of dependency frames in the video upon which decoding of the frame to be displayed depends;

means for indicating that one or more associated dependency frames are to be decoded;

means for queuing the one or more associated dependency frames that have not already been queued; and means for updating a frame state model based on the indication, the frame state model indicating, for each queued frame of the video, a decode status and a display status, wherein the decode status and the display status at least indicate whether the queued frame has been decoded and whether the queued frame has been displayed, said means for updating the frame state model including means for receiving respective messages indicating status transitions to the decode status and to the display status.

43. The method of claim 1 wherein updating a frame state model further comprises:

maintaining, in the frame state model, an independent indication of the decode status and the display status of a frame for each time the frame is queued.

44. The method of claim 1 further comprising:

identifying, from a plurality of available codecs, a codec with which the frame that is to be displayed was encoded; and decoding the frame using the identified codec.

45. The method of claim 19 wherein updating a frame state model further comprises:

maintaining, in the frame state model, an independent indication of the decode status and the display status of a frame for each time the frame is queued.

46. The machine-readable storage device of claim 20 further comprising instructions that, when executed by a processing apparatus, cause the processing apparatus to perform operations comprising:

maintaining, in the frame state model, an independent indication of the decode status and the display status of a frame for each time the frame is queued.

47. The machine-readable storage device of claim 20 further comprising instructions that, when executed by a processing apparatus, cause the processing apparatus to perform operations comprising:

identifying, from a plurality of available codecs, a codec with which the frame that is to be displayed was encoded; and decoding the frame using the identified codec.

* * * * *